United States Patent
Xu et al.

(10) Patent No.: US 12,096,470 B2
(45) Date of Patent: Sep. 17, 2024

(54) NON-SDT DRB HANDLING

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Murtaza A. Shikari, Mountain View, CA (US); Ralf Rossbach, Munich (DE); Sarma V. Vangala, Campbell, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 17/437,800

(22) PCT Filed: Jan. 14, 2021

(86) PCT No.: PCT/CN2021/071791
§ 371 (c)(1),
(2) Date: Sep. 9, 2021

(87) PCT Pub. No.: WO2022/151168
PCT Pub. Date: Jul. 21, 2022

(65) Prior Publication Data
US 2022/0361239 A1    Nov. 10, 2022

(51) Int. Cl.
*H04W 74/08*   (2024.01)
*H04W 76/27*   (2018.01)

(52) U.S. Cl.
CPC ........... *H04W 74/08* (2013.01); *H04W 76/27* (2018.02)

(58) Field of Classification Search
CPC ..... H04W 74/08; H04W 76/27; H04W 72/23; H04W 74/0833; H04W 76/19; H04W 48/06; H04W 68/005
See application file for complete search history.

(56) References Cited

U.S. PATENT DOCUMENTS

2014/0051415 A1*  2/2014  Ekici ............... H04W 76/27
                                                 455/418
2022/0039194 A1*  2/2022  Zhang ............ H04W 74/0833

FOREIGN PATENT DOCUMENTS

| WO | 2014157829 A1 | 10/2014 |
| WO | 2020087280 A1 | 5/2020 |
| WO | 2020088097 A1 | 5/2020 |

OTHER PUBLICATIONS

International Search Report for PCT Patent Application No. PCT/CN2021/071791; mailed Oct. 13, 2021.

(Continued)

*Primary Examiner* — Quoc Thai N Vu
(74) *Attorney, Agent, or Firm* — Kowert, Hood, Munyon, Rankin & Goetzel, P.C.

(57) ABSTRACT

Apparatuses, systems, and methods for non-small data transmission (non-SDT) dedicated radio bearer (DRB) handling while in a radio resource control (RRC) inactive state. A wireless device may determine, while operating in the RRC inactive state, that non-SDT data is available for transmission on a non-SDT DRB and determine, based on one or more conditions, to transmit, to a base station, non-SDT data arrival information during SDT procedure. The one or more conditions may be associated with arrival time of the non-SDT data and/or an amount of non-SDT data to be transmitted. The arrival time may be relative to arrival of SDT data, initiation of an SDT procedure, and/or initiation of a subsequent transmission period of an SDT procedure.

20 Claims, 25 Drawing Sheets

(56) References Cited

OTHER PUBLICATIONS

MediaTek Inc. "Summary of email discussion [Post 111-e][926]Extension scenarios for ToAddMod lists"; 3GPP TSG-RAN WG2 Meeting #112-e R2-2009976; Nov. 2-13, 2020.
Vivo "Views on NR small data transmission enhancements in Rel-17"; 3GPP TSG-RAN Meeting #86 RP-192549; Sitges, Spain; Dec. 9-12, 2019.

* cited by examiner

NON-SDT DRB HANDLING

FIELD

The disclosure relates to wireless communications, including apparatuses, systems, and methods for non-SDT DRB handling during an SDT procedure, e.g., in 5G NR systems and beyond.

BACKGROUND

Wireless communication systems are rapidly growing in usage. In recent years, wireless devices such as smart phones and tablet computers have become increasingly sophisticated. In addition to supporting telephone calls, many mobile devices now provide access to the Internet, email text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Aspects relate to wireless communications, and more particularly to apparatuses, systems, and methods for non-SDT DRB handling during an SDT procedure, e.g., in 5G NR systems and beyond.

For example, in some aspects, a user equipment device (UE), such as UE 106, may be configured to perform a method for non-SDT dedicated radio bearer (DRB) handling while in a radio resource control (RRC) inactive state. The method may include the UE determining, while operating in the RRC inactive state, that non-SDT data is available for transmission on a non-SDT DRB and determining, based on one or more conditions, to transmit, to a base station, non-SDT data arrival information during an SDT procedure. The one or more conditions may be associated with arrival time of the non-SDT data and/or an amount of non-SDT data to be transmitted. The arrival time may be relative to arrival of SDT data, initiation of an SDT procedure, and/or initiation of a subsequent transmission period of an SDT procedure.

As another example, a base station, such as base station 102, may be configured to perform a method for non-SDT DRB handling. The method may include the base station receiving, from a UE, such as UE 106, operating in an RRC inactive state, non-SDT data arrival information during an SDT procedure, determining, based at least in part, on a quantity of non-SDT data being less than a threshold, to trigger the UE to transmit the non-SDT data via the SDT procedure, and transmitting, to the UE, instructions to resume the non-SDT DRB for the SDT procedure. The instructions may be transmitted via a MAC CE. The threshold may be predefined (e.g., via a 3GPP standard), configured by the base station (e.g., by the network), and/or carrier specific.

The techniques described herein may be implemented in and/or used with a number or different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various aspects is considered in conjunction with the following drawings, in which.

Figure 1A:
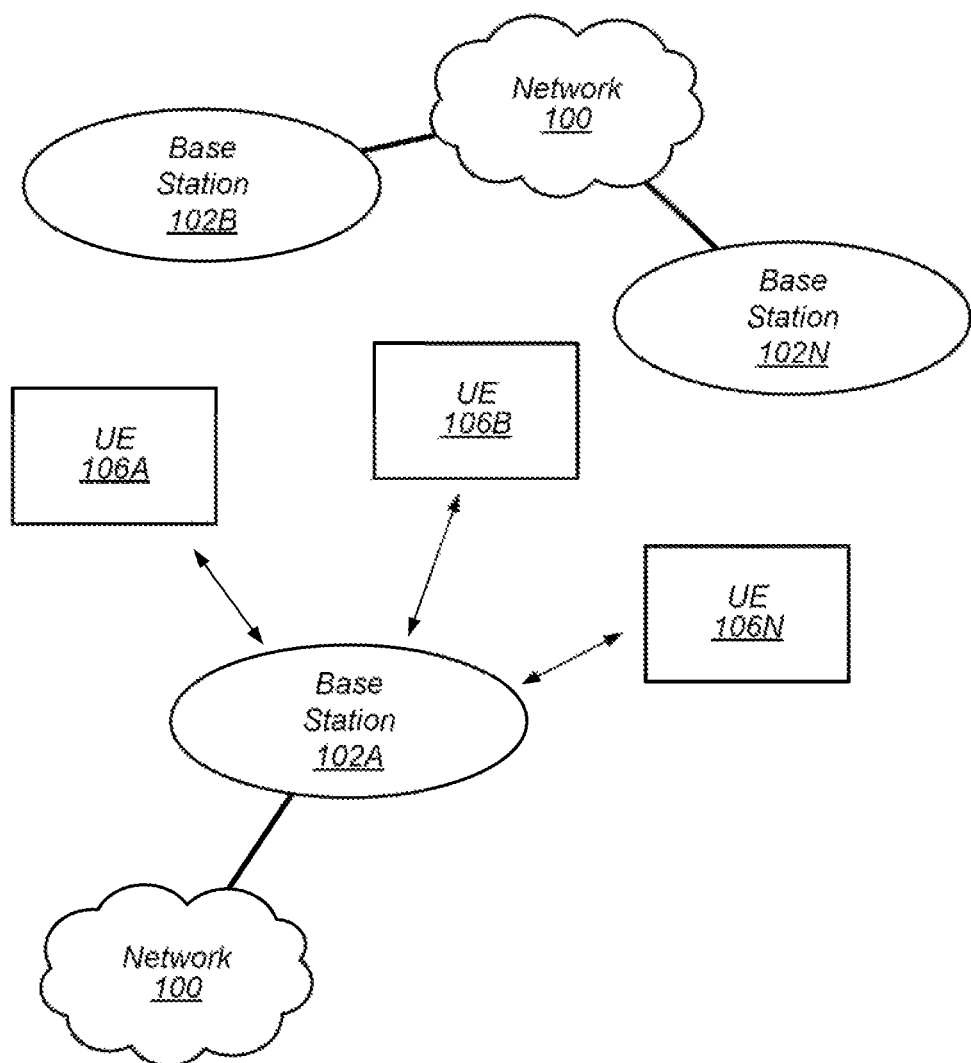
FIG. 1A illustrates an example wireless communication system according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer program) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from line grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones portable gaming devices, laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver, it should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, anchor 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork, with the EPC/5GC via a network entity, such as an Evolved Packet Data Gateway and/or a 5G NR gateway. In general, non-3GPP access refers to various types on non-cellular access technologies.

Automatically refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing, on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are perfumed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
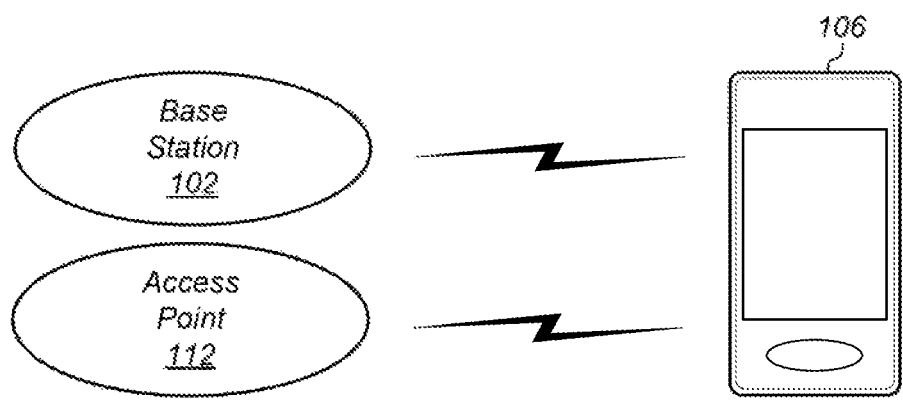
FIG. 1B illustrates an example of a base station and an access point in communication with a user equipment (UE) device, according to some aspects.

FIGS. 1A and 1B: Communication Systems

FIG. 1A illustrates a simplified example wireless communication system, according to some aspects. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context: of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some aspects. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method aspects described herein by executing such stored instructions. Alternatively, or in addition, the UE 106 may include a programmable hardware element such as an FPGA (field-programmable gate array) that is configured to perform any of the method aspects described herein, or any portion of any of the method aspects described herein.

The UE 106 may include one or more antennas for communicating using one or more wireless communication protocols or technologies. In some aspects, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using, the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and, other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RT for LTE or GSM), and separate radios for communicating using each of Wi-Fi and Bluetooth. Other configurations are also possible.

Figure 2:
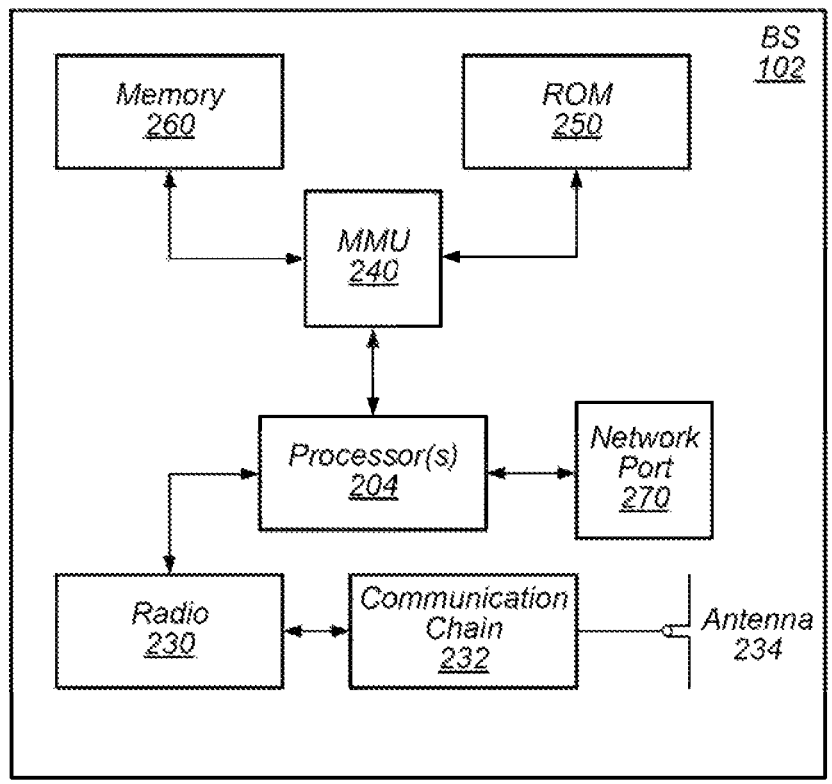
FIG. 2 illustrates an example block diagram of a base station, according to some aspects.

FIG. 2: Block Diagram of a Base Station

Figure 3:
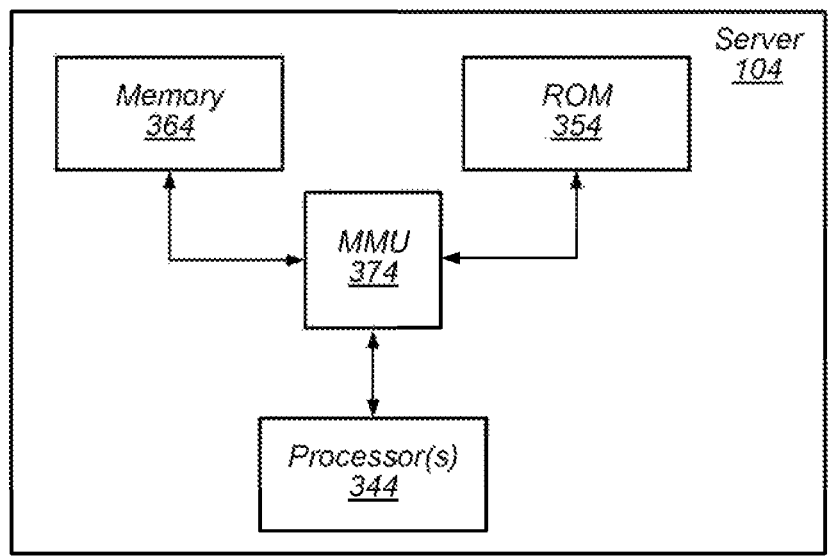
FIG. 3 illustrates an example block diagram of a server according to some aspects.

FIG. 2 illustrates an example block diagram of a base station 102, according to some aspects. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network part) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some aspects, base station 102 may be a next generation base station, e.g., 5G New Radio (5G NR) base station, or "eNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some aspects. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some aspects, the server 104 may be part of a radio access network, such as a 5G New Radio (5G NR) radio access network. In some aspects, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stared on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
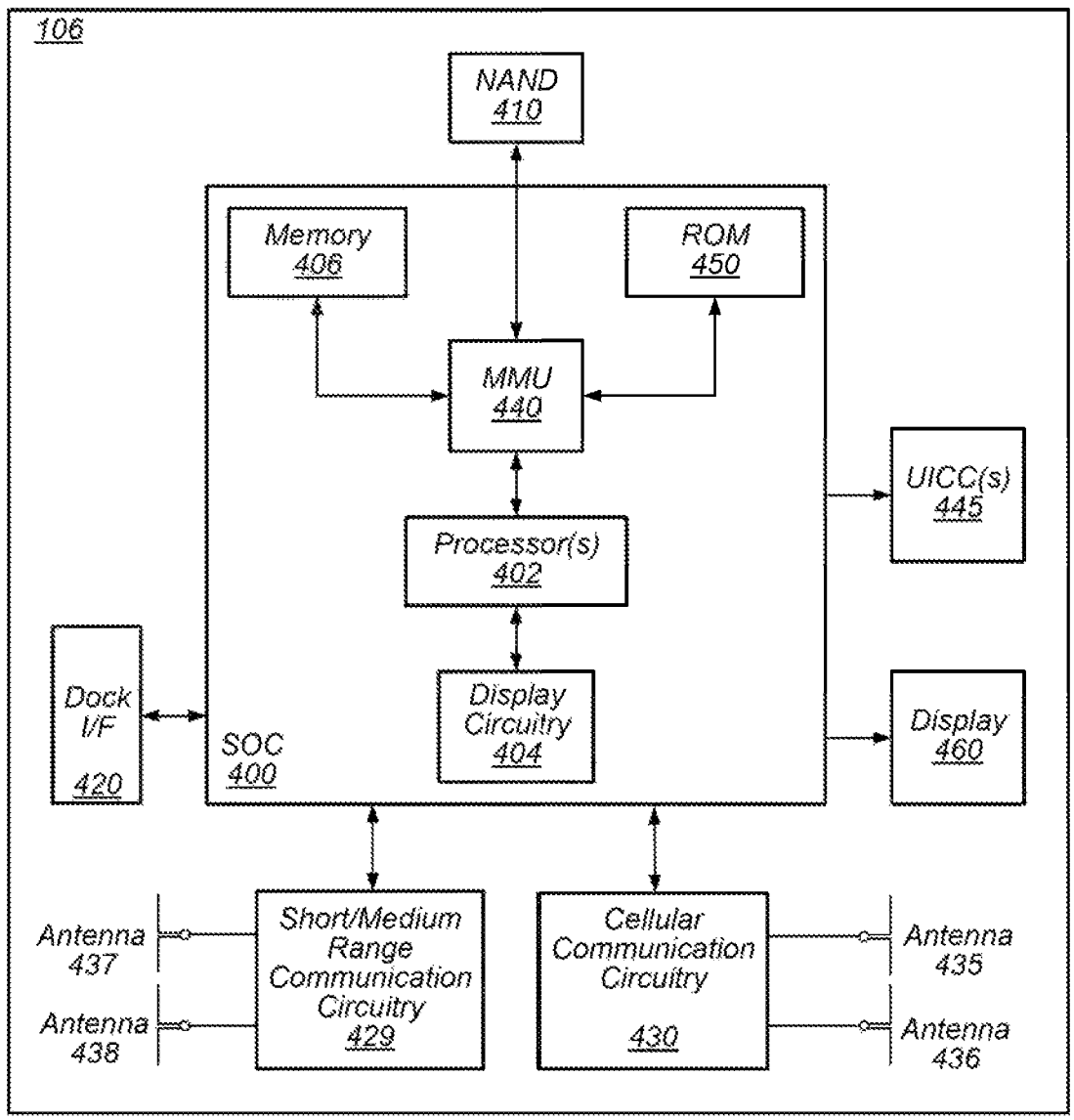
FIG. 4 illustrates an example block diagram of a UE according to some aspects.

FIG. 4: Block Diagram of a UE

FIG. 4 illustrates an example simplified block diagram of a communication device 106, according to some aspects. It is noted that the block diagram of the communication device of FIG. 4 is only one example of a possible communication device. According to aspects, communication device 106 may be a user equipment (UE) device, a mobile device or mobile station, a wireless device or wireless station a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some aspects, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some aspects, as further described below, cellular communication circuitry 430 may include dedicated receive chains (including and/or coupled to, e.g., communicatively; directly or indirectly, dedicated processors and/or radios) for multiple RATs a first receive chain for LTE and a second receive chain for 5G NR). In addition, in some aspects, cellular communication circuitry 430 may include a single transmit chain that may be switched between radios dedicated to specific RATs. For example, a first radio may be dedicated to a last RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some aspects, the UE 106 may include at least two SIMs, Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some aspects (such as when the SIM(s) include an eUICC), one or more of the SIM(s) may implement embedded SIM (eSIM) functionality; in such an aspect, a single one of the SIM(s) may execute multiple SIM applications. Each of the SIMs may include components such as a processor and/or a memory; instructions for performing SIM/eSIM functionality may be stored in the memory and executed by the processor. In some aspects, the UE 106 may include a combination of removable smart cards and faced/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some aspects, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some aspects, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain aspects the voice call may be a packet switched communication. In other words, the voice call may be received using voice over LTE (VoLTE) technology and/or voice over NR (VoNR) technology. In some aspects, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some aspects, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some aspects, the MMU 440 may be included as a portion of the processor(s) 402.

As noted above, the communication device 106 may be configured to communicate using wireless and/or wired communication circuitry. The communication device 106 may be configured to perform methods for non-SDT DRB handling during an sur procedure, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
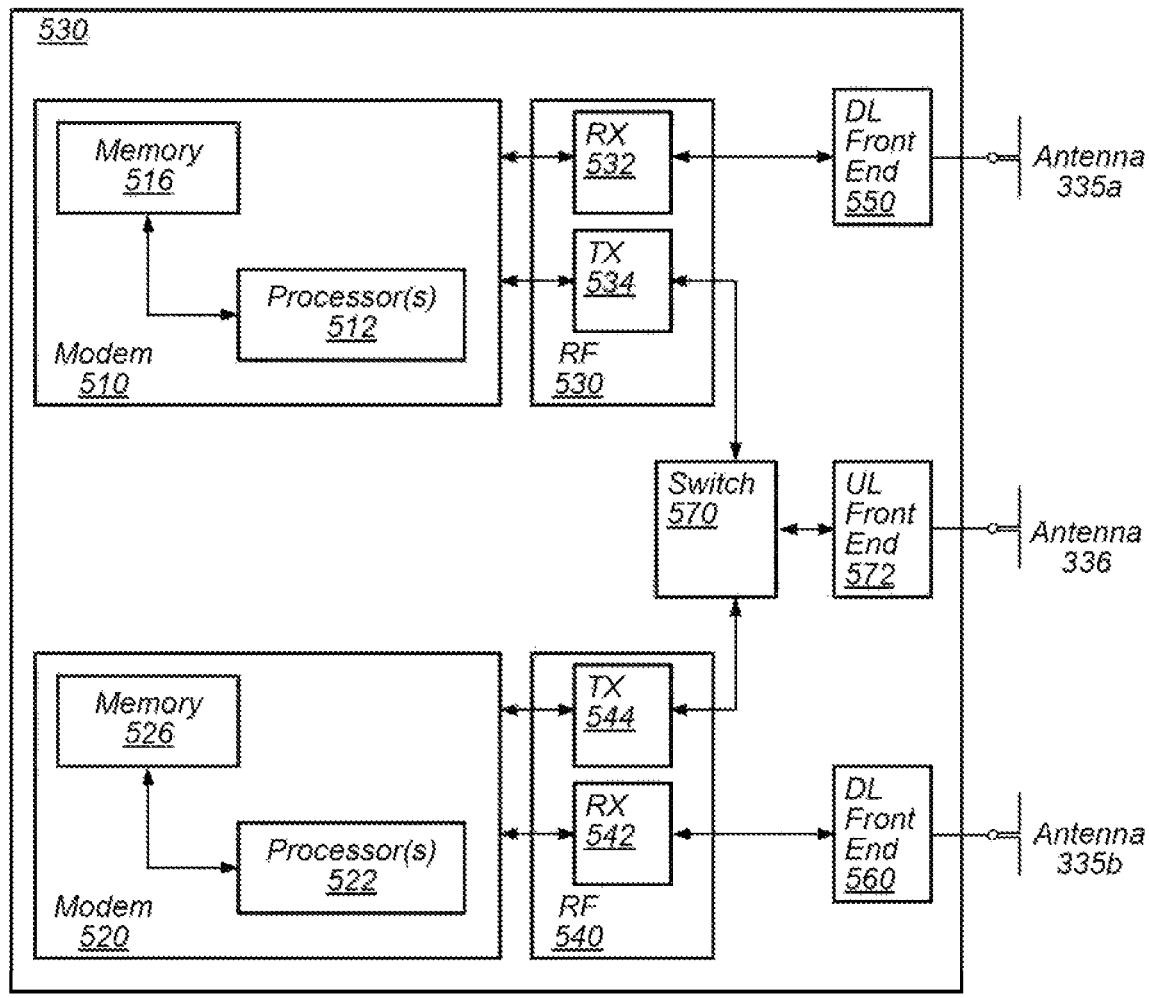
FIG. 5 illustrates an example block diagram of cellular communication circuitry, according to some aspects.

FIG. 5: Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit. According to aspects, cellular communication circuitry 530, which may be cellular communication circuit 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some aspects, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and, a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a mentor 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550 which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335*b*.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may bewitched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and front end 572).

In some aspects, the cellular communication circuitry 530 may be configured to perform methods non-SDT DRB handling during an SDT procedure, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured ID perform the functions of processors 522.

Figure 6A:
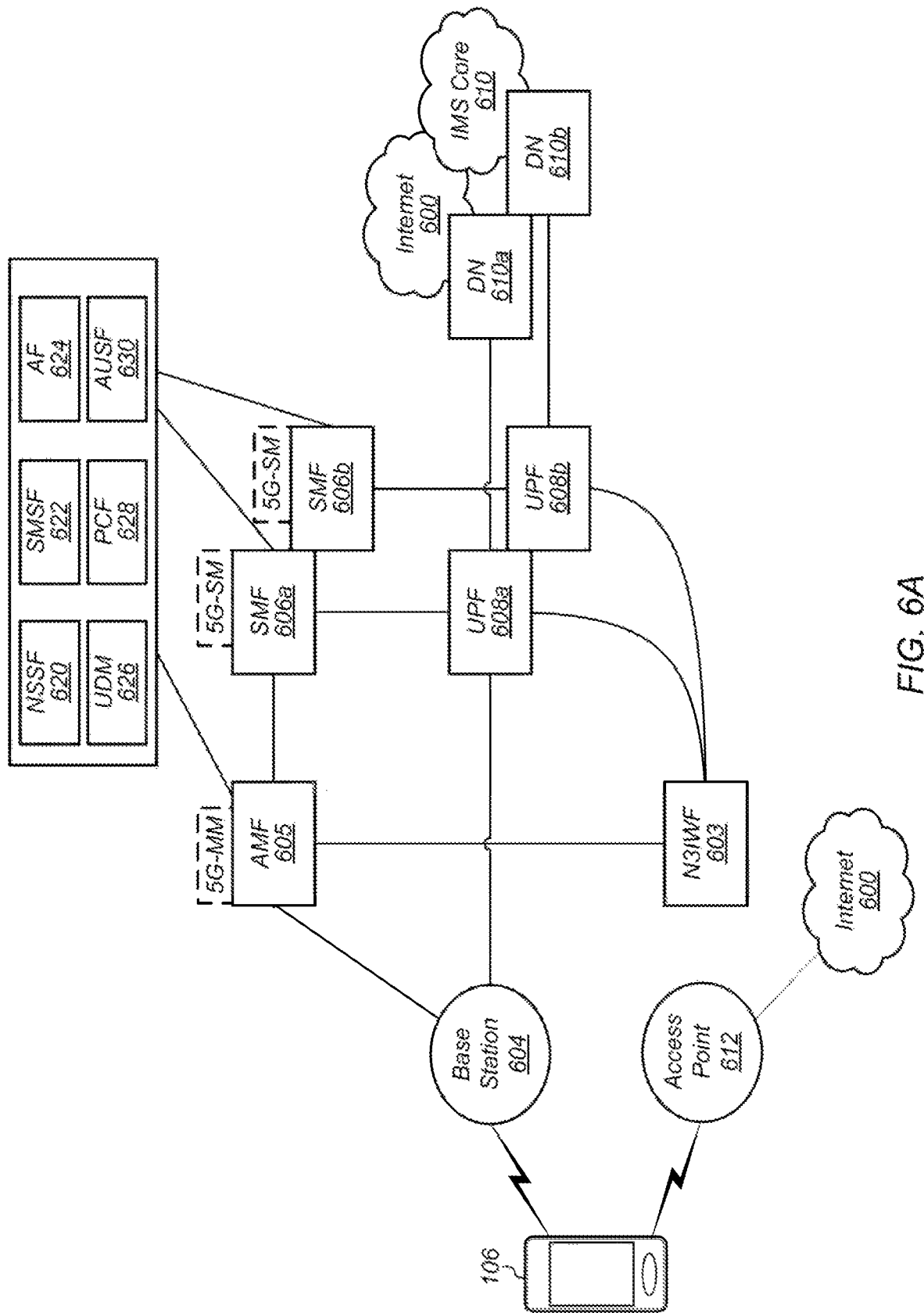
FIG. 6A illustrates an example of a 5G network architecture that incorporates both 3GPP (e.g., cellular) and non-3GPP (e.g., non-cellular) access to the 5G CN, according to some aspects.
Figure 6B:
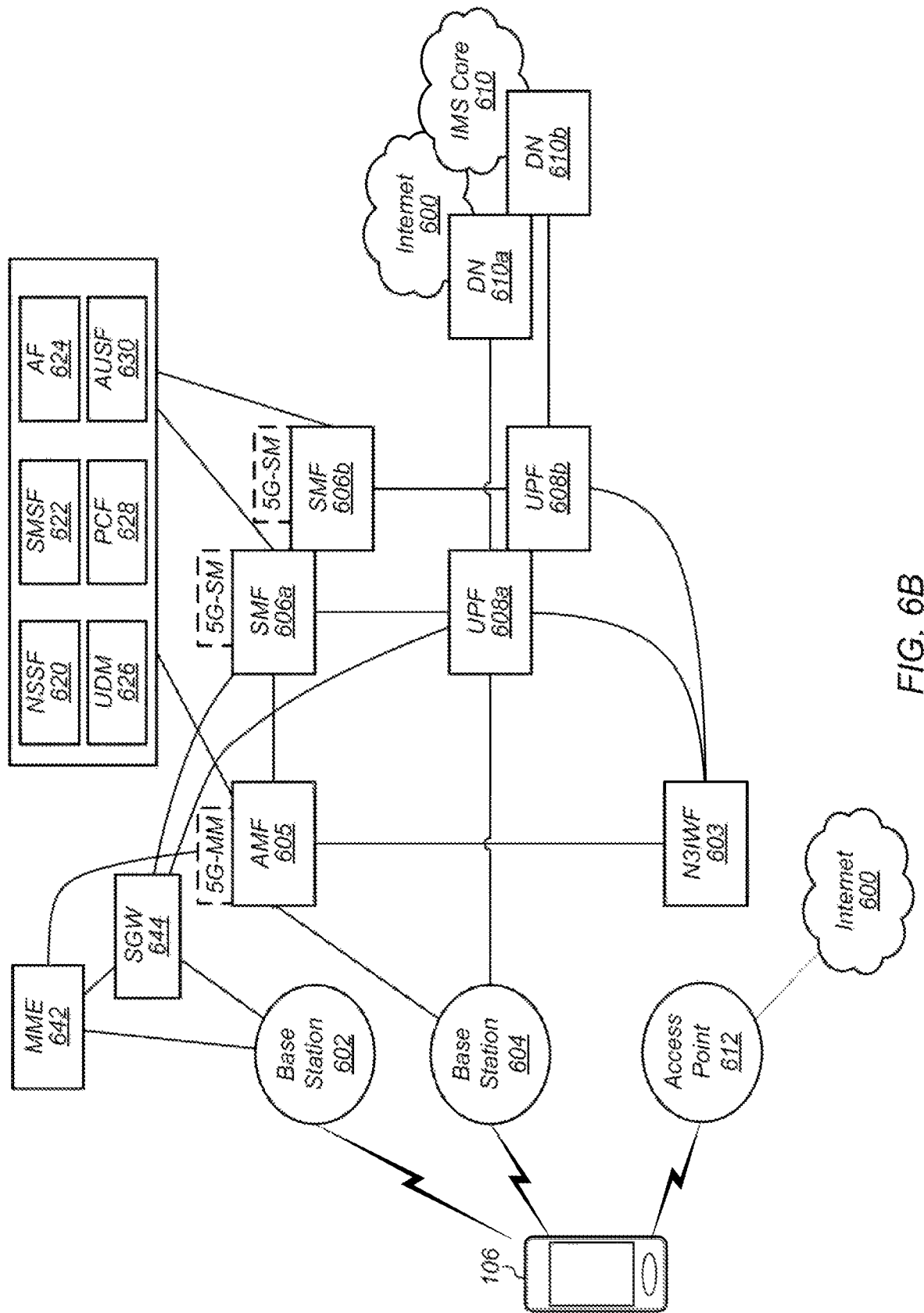
FIG. 6B illustrates an example of a 5G network architecture that incorporates both dual 3GPP (e.g., LTE and 5G NR) access and non-3GPP access to the 5G CN, according to some aspects.
Figure 7:
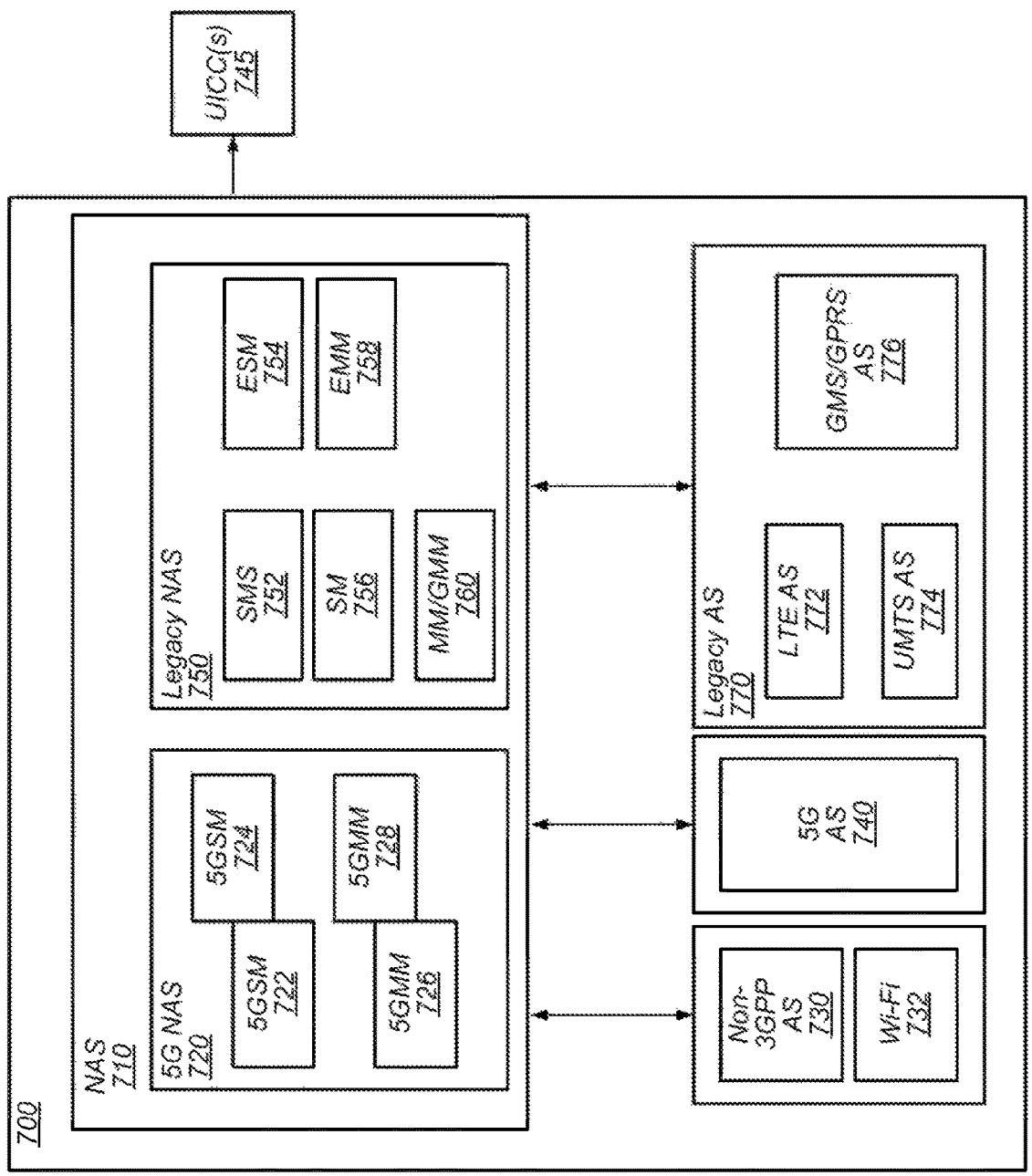
FIG. 7 illustrates an example of a baseband processor architecture for a UE, according to some aspects.

FIGS. 6A, 6B and 7: 5G Core Network Architecture—Interworking with Wi-Fi

In some aspects, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP non-cellular) access to the 5G CN, according to some aspects. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCP) 628, and/or authentication server function (AUSF) 630). Note that these functional entities may also be supported by a session management function (SMF) 606 a and an SMF 606 b of the 5G CN. The AMF 605 may be connected to (or in communication with) the SMF 606 a. Further, the gNB 604 may in communication with (or connected to) a user plane function (UPF) 608 a that may also be communication with the SMF 606 a. Similarly, the N3IWF 603 may be communicating with a UPF 608 b that may also be communicating with the SMF 606 b. Both UPFs may be communicating with the data network (e.g., DN 610 a and 610 b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some aspects. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604. As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various aspects, one or more of the above-described network entities may be configured to perform methods to improve security checks in a 5G NR network, including mechanisms non-SDT DRB handling during an SDT procedure, e.g., in 5G NR systems and beyond, e.g., as further described herein.

FIG. 7 illustrates an example of a baseband processor architecture for a UE such as UE 106), according to some aspects. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various aspects, one or more of the above-described functional entities of the 5G NAS and/or 5G AS may be configured to perform methods non-SDT DRB handling during an SDT procedure, 5G NR systems and beyond, e.g., as further described herein.

Non-SDT DRB Handling During an SDT Procedure

In some current implementations of cellular communication networks, transmission of data packets, for example small data transmissions (SDTs) may require an established radio resource control (RRC) connection between a wireless device, such as a UE, and a base station. Thus, while in an RRC inactive state, the UE may, in a control plane, have a network access stratum (NAS) connection to the core network (CN), but may have no dedicated access stratum (AS) resource for an RRC connection. Further, in a user plane, the UE may not perform any dedicated transmission and/or reception. Thus, if the UE has a dedicated transmission and/or reception, the UE may be required to enter an RRC connected (RRC_CONNECTED) state. As an example, for a downlink (DL) data transmission, the base station may page the UE via a radio access network (RAN) paging mechanism to trigger the UE to enter an RRC connected state. Similarly, for an uplink (UL) transmission, the UE may trigger a random-access channel (RACH) procedure to eater an RRC connected state. Additionally, the UE, while in the RRC inactive state, may move within a RAN notification area (RNA) without notifying the RAN.

Note that when a UE transitions from an RRC connected state to an RRC inactive state, the UE may send an RRC release with suspend information message to the base station. Further, when the UE transitions from an RRC inactive state to an RRC connected state, the UE may perform an RRC resume procedure with the base station. Finally, when the UE transitions from an RRC inactive state to an RRC idle state, the UE may send an RRC release message. This may also occur if and/or when a UE cannot find a cell for camping.

Figure 8A:
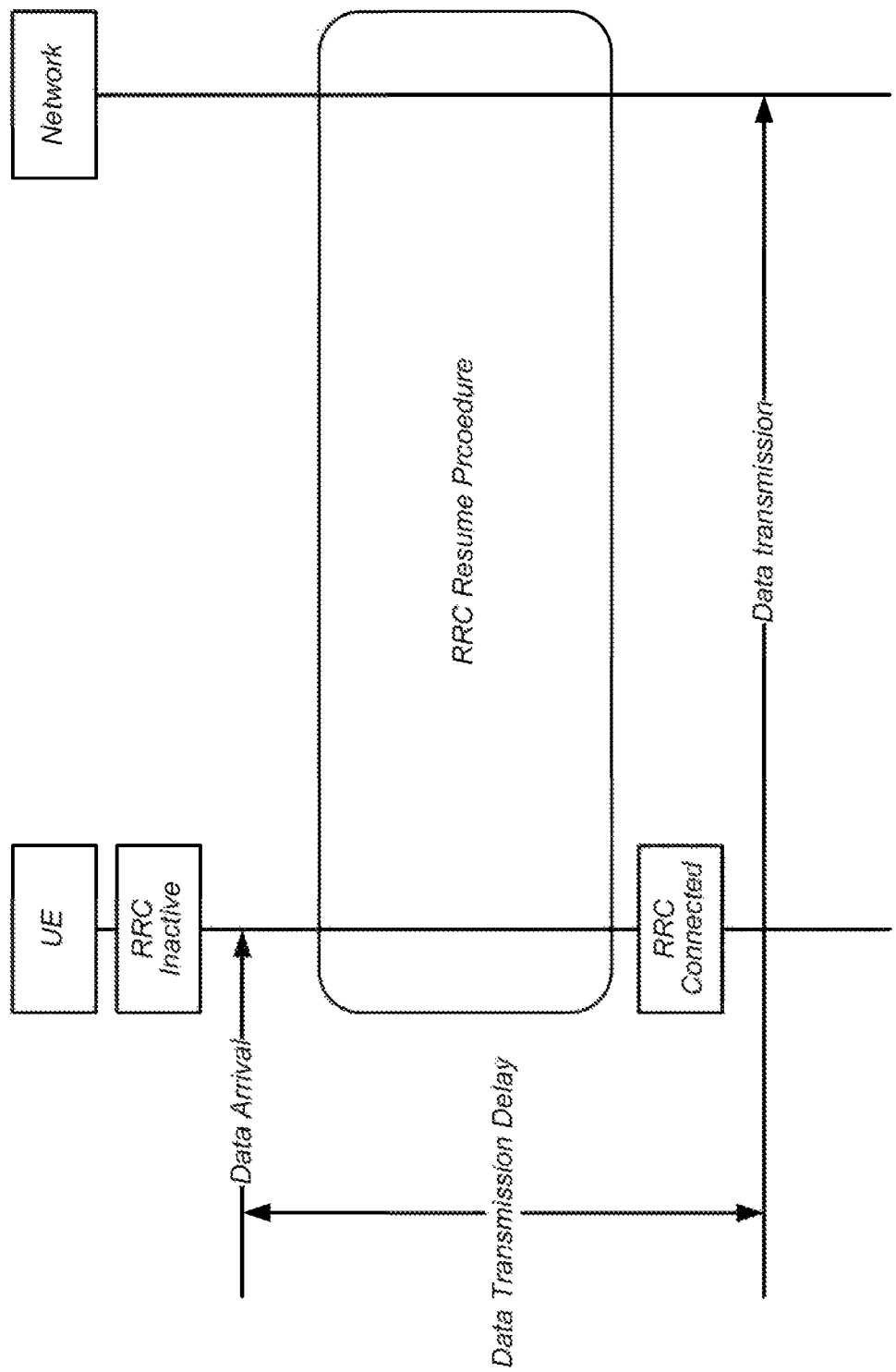
FIG. 8A illustrates an example of a delay for small data transmissions when a UE is required to perform an RRC resume procedure.

Thus, as illustrated by FIG. 8A, some current implementations (e.g., pre 3GPP Release 17 implementations) may require a UE in an RRC inactive state to perform an RRC resume connection procedure upon detection of data arrival for transmission to the network. As can be seen from FIG. 8A, such a procedure causes a delay for data transmission as well resource consumption at the UE to perform the RRC resume connection procedure.

Figure 8B:
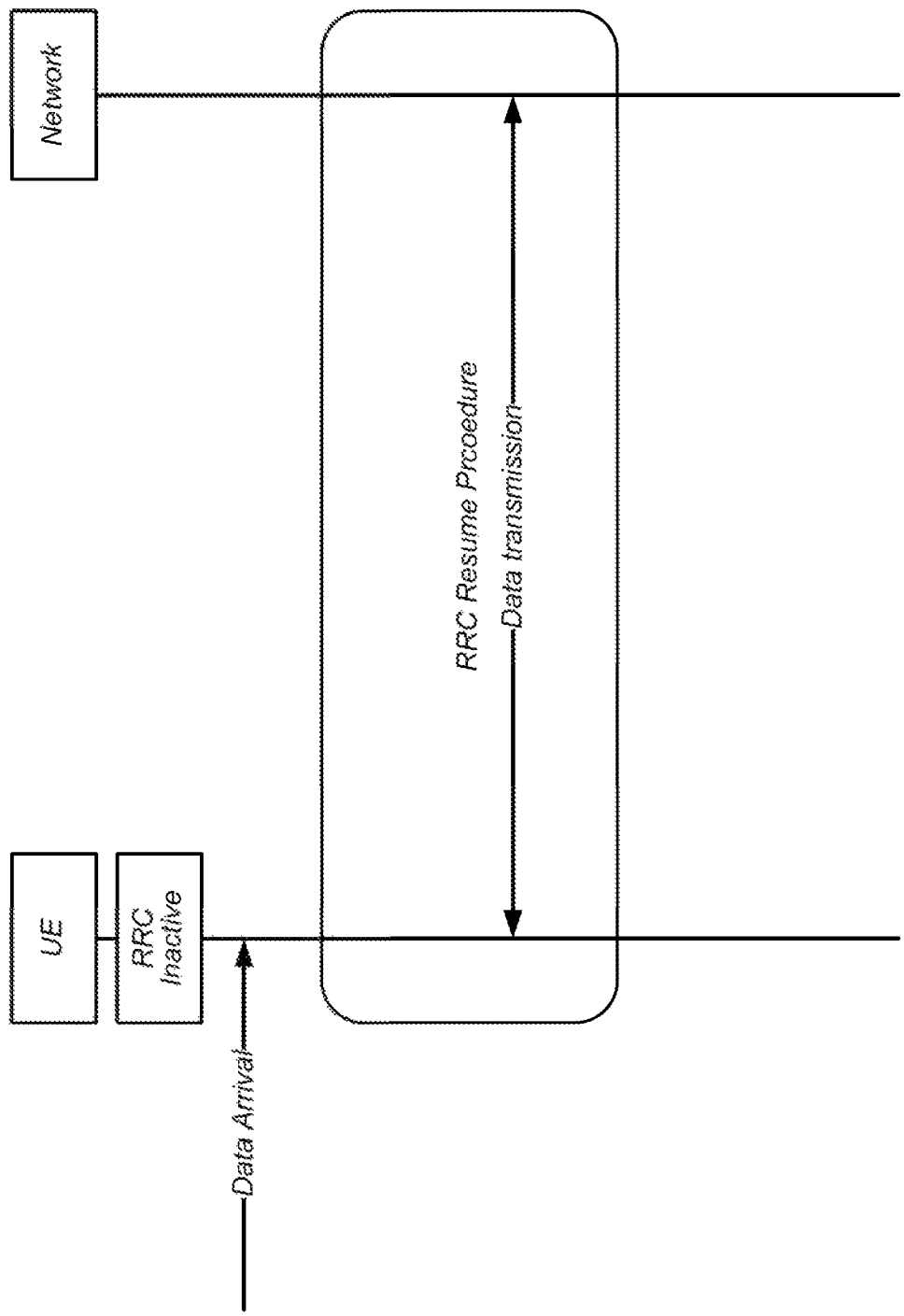
FIG. 8B illustrates an example of a small data transmission when a UE is not required to perform an RRC resume procedure.

To address the above issues, implementations of 3GPP Release 17 may include support for small data transmission (SDT) while a UE is in an RRC inactive state, e.g., without transitioning to an RRC connected state. For example, as illustrated by FIG. 8B, a UE in an RRC inactive state may perform data transmission/reception upon detection of data arrival for transmission to the network without performing an RRC resume connection procedure. As can be see from FIG. 8B, such a procedure reduces the delay for data transmission as well as reducing resource consumption at the UE, e.g., as compared to the procedure described in FIG. 8A.

Note that for both RACH and cell group (CG) based solutions, implementations may require that upon initiating a resume procedure for SDT initiation (e.g., for a first SDT transmission), the UE is required to re-establish at least SDT packet data convergence protocol (PDCP) entities and resume SDT data radio bearers (DRBs) that are configured for SDT as well as signaling radio bearer 1 (SRB1). As can be seen from FIG. 8B, UE operation for SDT DRB is clear in the case of UL data arrival. In particular, the UE may reestablish the PDCP entity, apply a newly derived security key, resume transmission, and trigger the SDT procedure. In some instances, a buffer status report (BSR) MAC CE may reflect a data amount of the SDT DRB. However, UE operation for non-SDT DRB remains unclear. Thus, if the UE always triggers a legacy RRC resume procedure during an SDT procedure, optimizations may be available regarding delay, signaling overhead, and/or power consumption.

Aspects described herein provide systems, methods, and mechanisms for non-small data transmission (non-SDT) dedicated radio bearer (DRB) handling while in a radio resource control (RRC) inactive state. A UE, such as UE 106, may determine, while operating in the RRC inactive state, that non-SDT data is available for transmission on a non-SDT DRB. The UE may then determine, based on one or more conditions, to transmit, to a base station, non-SDT data arrival information during an SDT procedure. The one or more conditions may be associated with arrival time of the non-SDT data and/or an amount of non-SDT data to be transmitted. The arrival time may be relative to arrival of SDT data, initiation of an SDT procedure, and/or initiation of a subsequent transmission period of an SDT procedure.

Figure 9A:
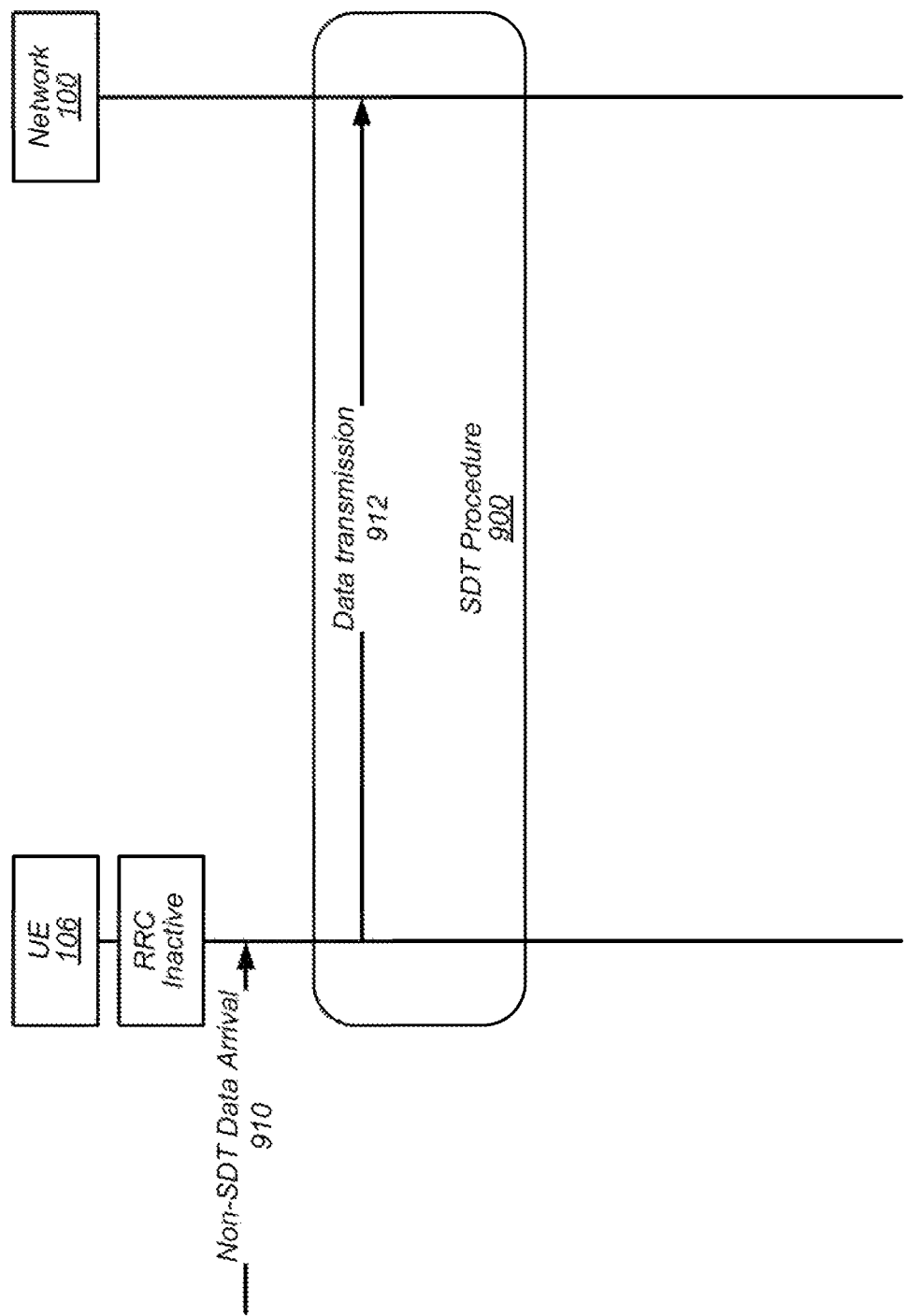
FIGS. 9A, 9B, and 9C illustrate various scenarios of a non-SDT procedure during an SDT procedure, according to some aspects.
Figure 9B:
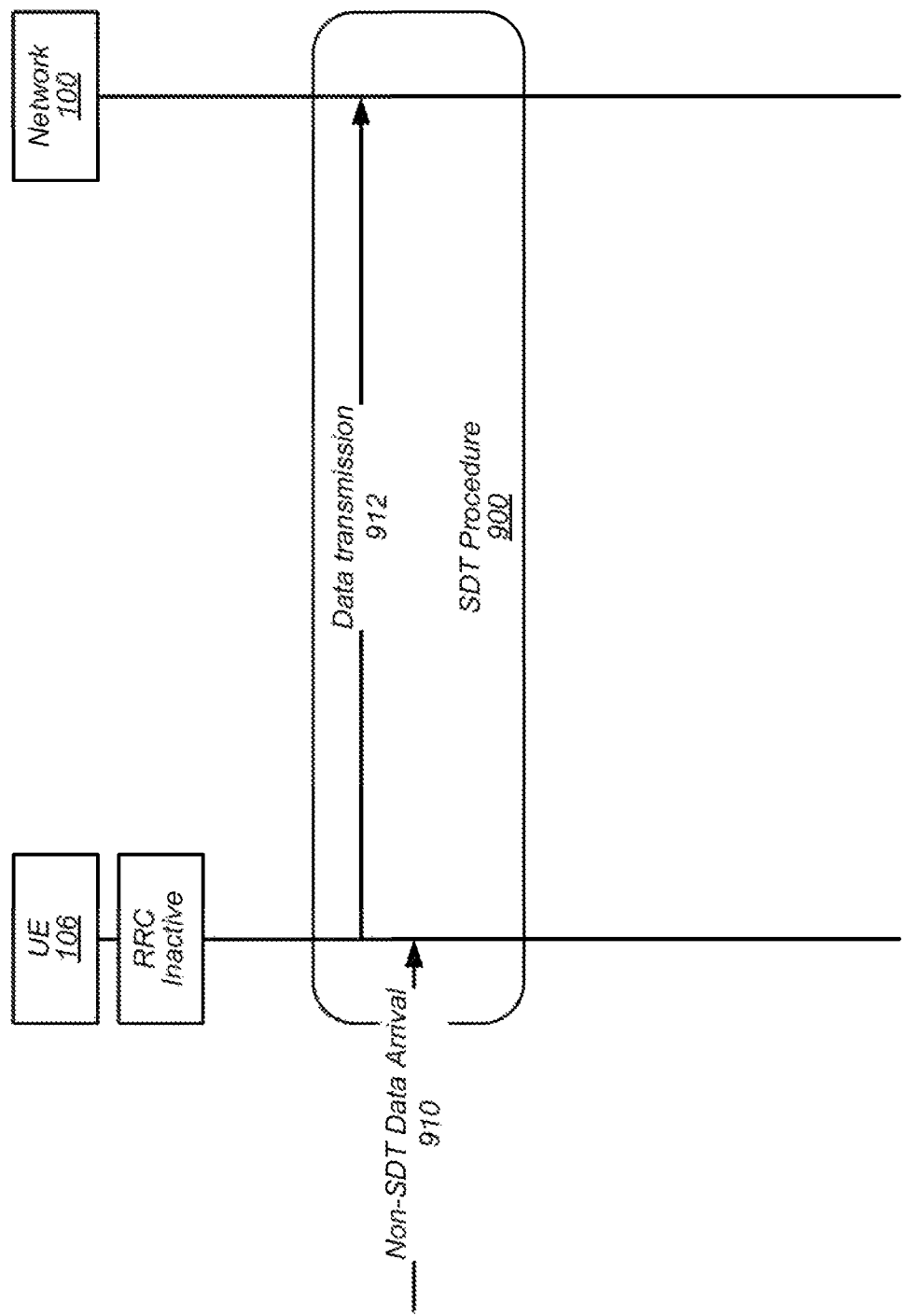
Figure 9C:
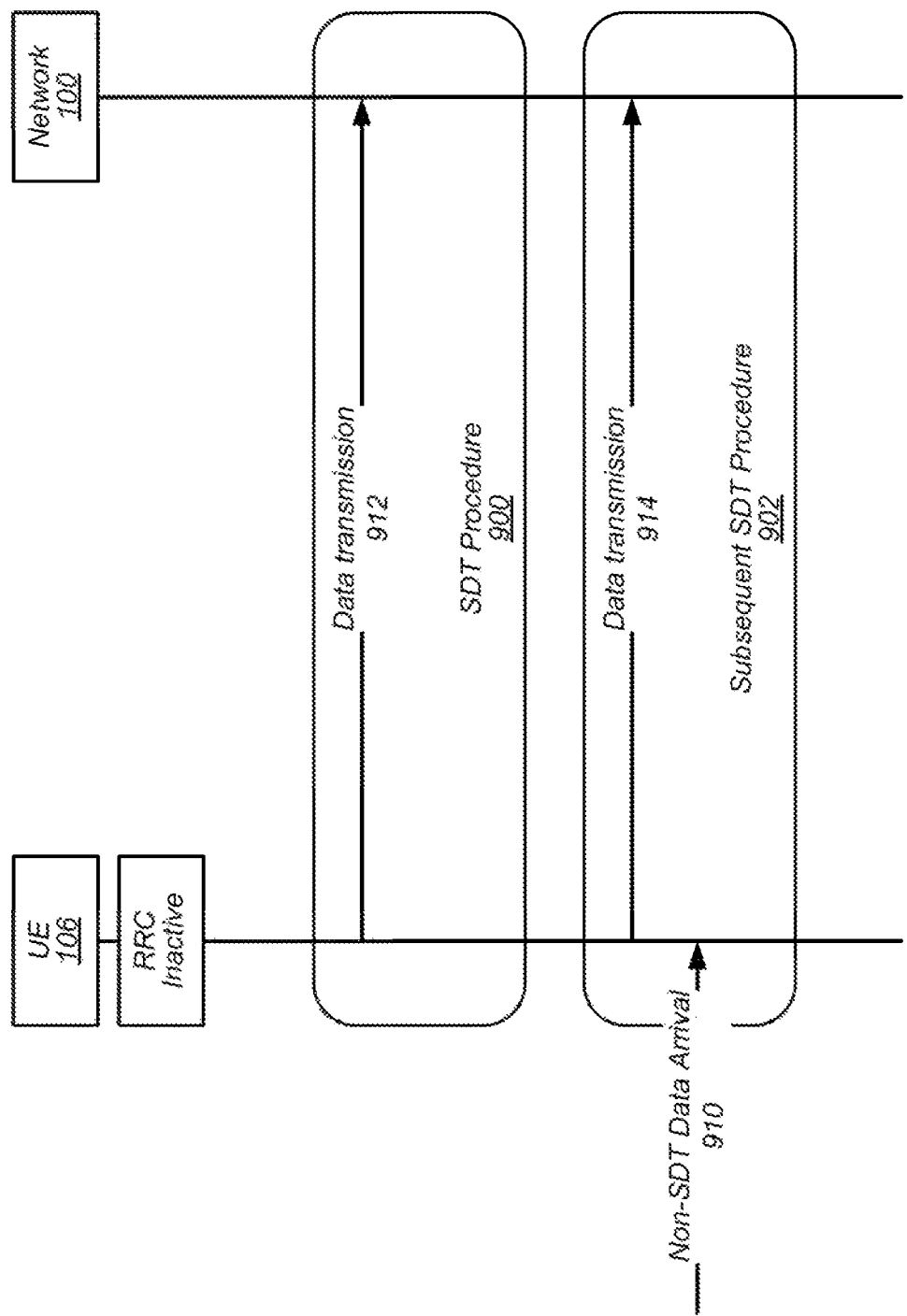

For example, in some aspects, in case of non-SDT data arrival, a UE, such as UE 106, may not trigger a legacy RRC resume procedure; instead, the non-SDT data arrival information may be carried via an UL data transmission during the SDT procedure. In some aspects, when receiving the non-SDT data arrival information, a network may inform the UE to resume the non-SDT data transmission. Note that aspects described herein may provide systems, methods, and mechanisms for arrival of non-SDT data prior to initiation of an SDT procedure (e.g., scenario 1 as illustrated by FIG. 9A), after initiation of an SDT procedure but prior to entering an SDT subsequent transmission period (e.g., scenario 2 as illustrated by FIG. 9B), and/or during an SDT subsequent transmission period (e.g., scenario 3 as illustrated by FIG. 9C). In some aspects, upon receiving the non-SDT data arrival information, the network may send an RRC message to trigger the UE to transition to an RRC connected state and/or inform the UE to transmit the non-SDT data via the SDT procedure.

In some aspects, the non-SDT data arrival information may be provided to the network via a single bit included in the UL data transmission. For example, the UL data transmission may include an additional bit to indicate the non-SDT data arrival information. As another example, the UL data transmission may include an additional bit to indicate a request to transition to an RRC connected state. In some aspects, the non-SDT data arrival information may be provided to the network via inclusion of a buffer status of the non-SDT DRB in a BSR MAC CE.

In some aspects, the non-SDT data arrival information may be signaled via layer 1 (L1) signaling, L2 signaling, and/or L3 signaling. For example, for L1 signaling, the non-SDT data arrival information may be carried in uplink control information (UCI) on a physical uplink control channel (PUCCH). As another example, for L2 signaling, the non-SDT data arrival information may be carried in a dedicated MAC CE and/or in the BSR MAC CE. As a further example, for L3 signaling, the non-SDT data arrival information may be carried in a first RRCResumeRequest message (e.g., if and/or when arrival of the non-SDT data occurs before initiation of an SDT procedure) and/or the non-SDT data arrival information may be carried in an RRCResumeRequest message and/or in a unified air interface (UAI) like RRC message to report UE information (e.g., if and/or when arrival of the non-SDT data occurs during a SDT subsequent transmission period).

FIGS. 9B, 9B, and 9C illustrate various scenarios of a non-SDT procedure during an SDT procedure, according to some aspects. As discussed above, when possible, a UE may not trigger a legacy RRC resume procedure upon arrival of non-SDT data for transmission, e.g., while in an RRC inactive state. In some aspects, the non-SDT data arrival information (e.g., as described herein) may be carried via an UL data transmission during the SDT procedure. From the network's perspective, when receiving the non-SDT data arrival information, the network may determine whether the UE is to resume the non-SDT data transmission or initiate an RRC resume procedure. As illustrated by FIG. 9A, in a first scenario, non-SDT DRB data may arrive before initiation of an SDT procedure. Thus, as shown, a UE, such as UE 106, may be in an RRC inactive state when the UE determines, at 910, that there is non-SDT data to be transmitted to a network, such as network 100. In some aspects, based on arrival time of SDT data in comparison to the non-SDT data, the UE may include non-SDT data arrival information as part of the data transmission 912 and/or initiate an RRC resume procedure, e.g., as further described in reference to FIGS. 11A-11E. As illustrated by FIG. 9B, in a second scenario, non-SDT DRB data may arrive after initiation on an SDT procedure. Thus, as shown, the UE may be in an RRC inactive state when the UE determines, at 910, that there is non-SDT data, to be transmitted to the network. In some aspects, based on arrival time of SDT data in comparison to the non-SDT data, the UE may, the UE may include non-SDT data arrival information as part of a subsequent data transmission and/or initiate an RRC resume procedure, e.g., as further described in reference to FIGS. 12A-12D. As illustrated by FIG. 9C, in a third scenario, non-SDT DRB data may arrive during a subsequent SDT procedure 902. In some aspects, based on arrival time of SDT data in comparison to the non-SDT data, the UE may include non-SDT data arrival information as part of a subsequent data transmission and/or initiate an RRC resume procedure, e.g., as further described in reference to FIG. 13.

Figure 10A:
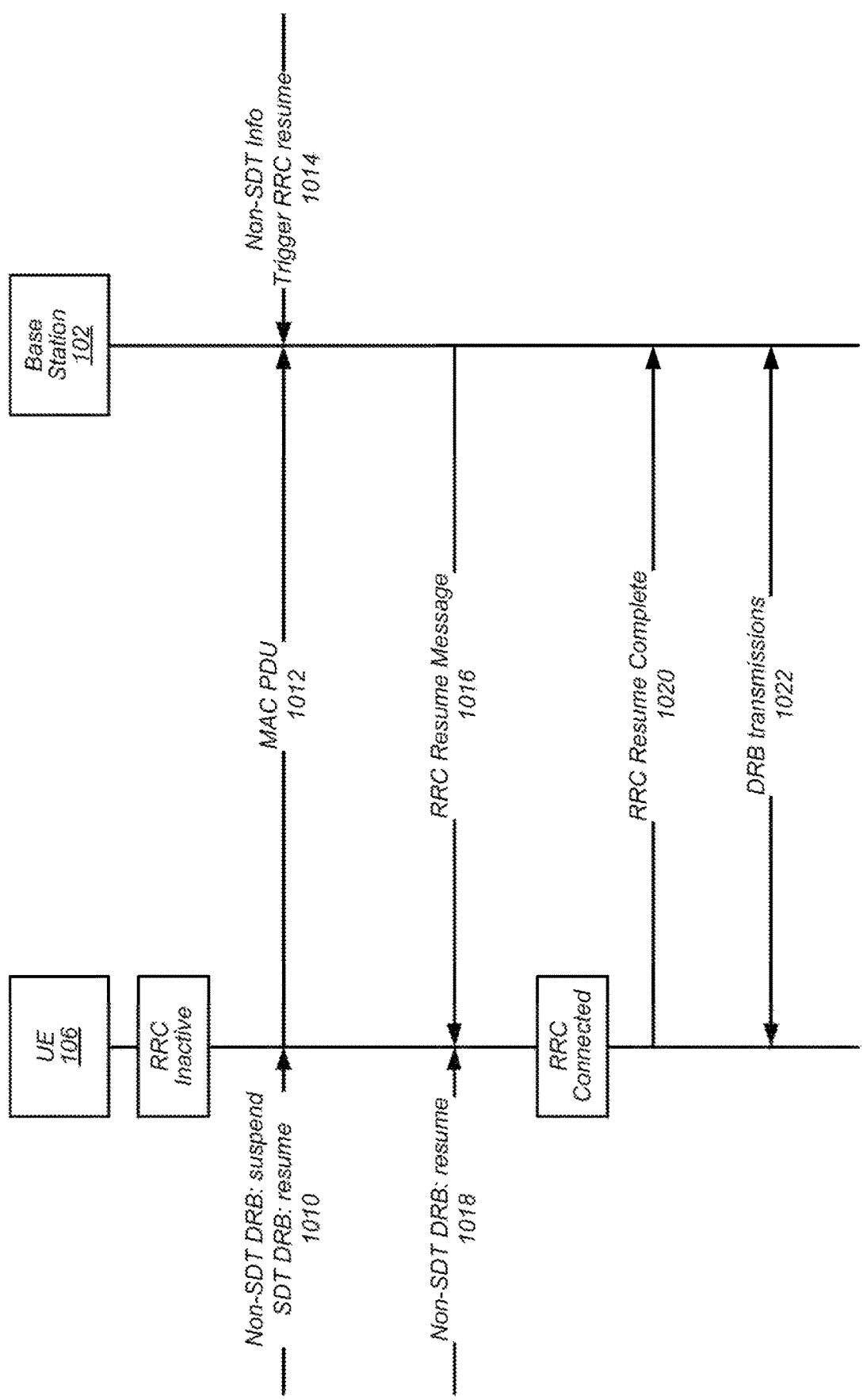
FIGS. 10A and 10B illustrate examples of network behavior upon receipt of non-SDT data arrival information, according to some aspects.
Figure 10B:
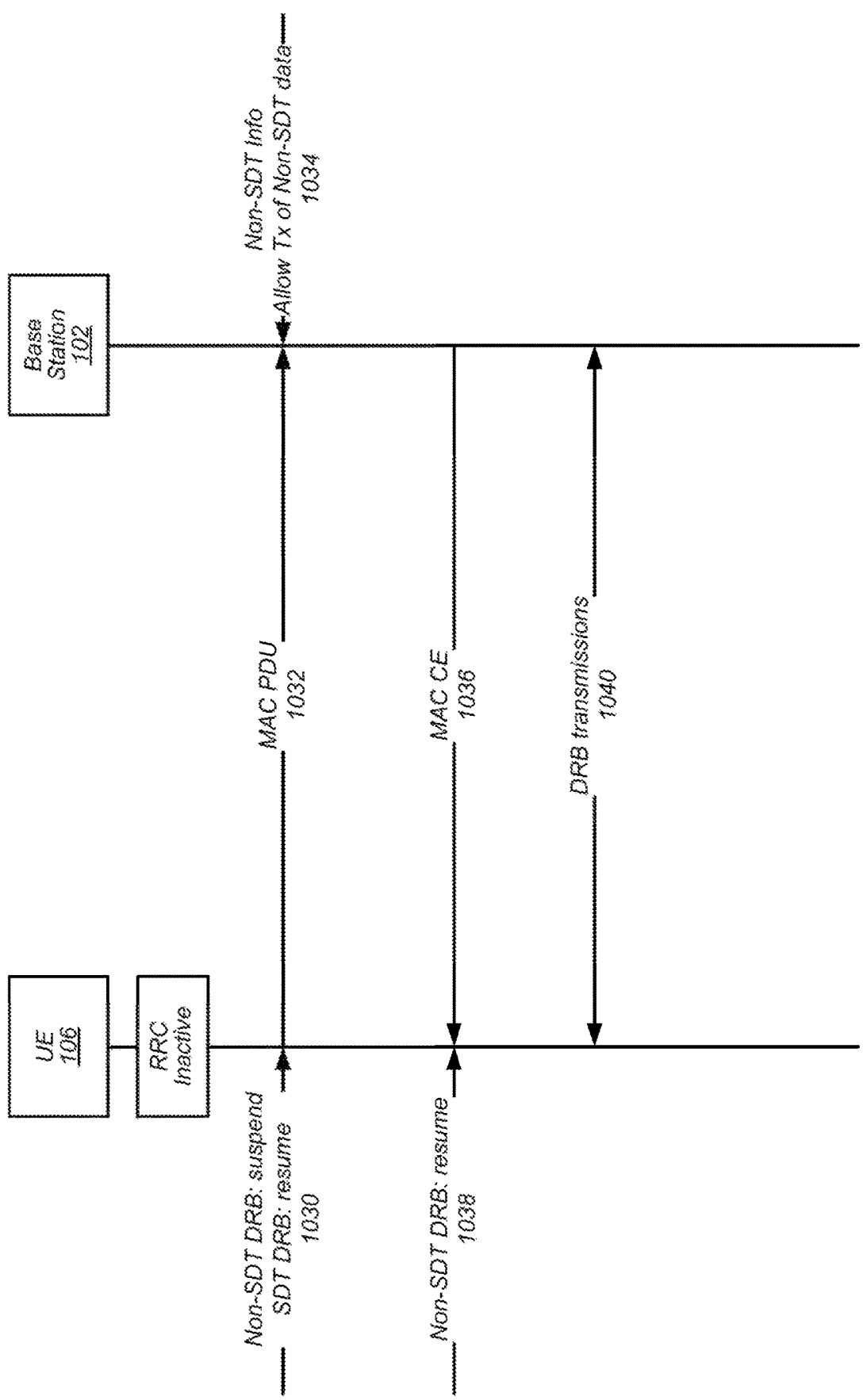

As noted, rom the network's perspective, when receiving the non-SDT data arrival information from a UE, the network (e.g., a base station of the network, such as base station 102) may determine whether the UE is to resume the non-SDT data transmission or initiate an RRC resume procedure. For example, as illustrated by FIG. 10A, the network may send an RRC message to the UE to trigger the UE to transition to an RRC connected state. As another example, as illustrated by FIG. 10B, the network may instruct the UE to transmit the non-SDT data via the SDT procedure. In at least some aspects, the network may determine whether the UE is to resume the non-SDT data transmission or initiate an RRC resume procedure based, at least in part, on a size and/or amount of the UE's non-SDT data, e.g., as indicated by the non-SDT data arrival information. From the UE's perspective, the UE will either the non-SDT data transmission when entering the CONNECTED state or when receiving the network's instructions (e.g., command) to transmit the non-SDT data via the SDT procedure.

In particular, as illustrated by FIG. 10A, a UE, such as UE 106, may be in an RRC inactive state upon arrival of non-SDT data at 1010. Note that at 1010, a non-SDT DRB may be suspended whereas an SDT DRB may be resumed. Based on the arrival of the non-SDT data, the UE may send a MAC PDU 1012 to a base station, such as base station 102, of the network. The MAC PDU 1012 may include an RRC resume request, SDT data, and non-SDT data arrival information. At 1014, based, at least in part, on a size and/or amount of the UE's non-SDT data, e.g., as indicated by the non-SDT data arrival information, the base station may determine to trigger the UE to transition to an RRC connected state. Thus, the base station may transmit an RRC resume message 1016 indicated the transition to the RRC connected state. In response to receipt of the RRC resume message 1016, the UE may transition the non-SDT DRB to a resumed state at 1018 as well as transitioning to an RRC connected state. The UE may send an RRC resume complete message 1020 to the base station to indicate successful transitioning to the RRC connected state. Then, the UE may transmit all DRBs at 1022.

Further, as illustrated by FIG. 10B, a UE, such as UE 106, may be in an RRC inactive state upon arrival of non-SDT data at 1020. Note that at 1020, a non-SDT DRB may be suspended whereas an SDT DRB may be resumed. Based on the arrival of the non-SDT data, the UE may send a MAC PDU 1032 to a base station, such as base station 102, of the network. The MAC PDU 1032 may include an RRC resume request, SDT data, and non-SDT data arrival information. At 1034, based, at least in part, on a size and/or amount of the UE's non-SDT data, e.g., as indicated by the non-SDT data arrival information, the base station may determine to instruct (and/or command) the UE to transmit the non-SDT data via the SDT procedure. Thus, the base station may transmit a MAC CE 1036 indicating the resumption of the non-SDT transmission. In response to receipt of the MAC CE 1036, the UE may transition the non-SDT DRB to a resumed state at 1038. Then, the UE may transmit non-SDT DRB data at 1040, e.g., in a subsequent SDT transmission procedure.

Figure 11A:
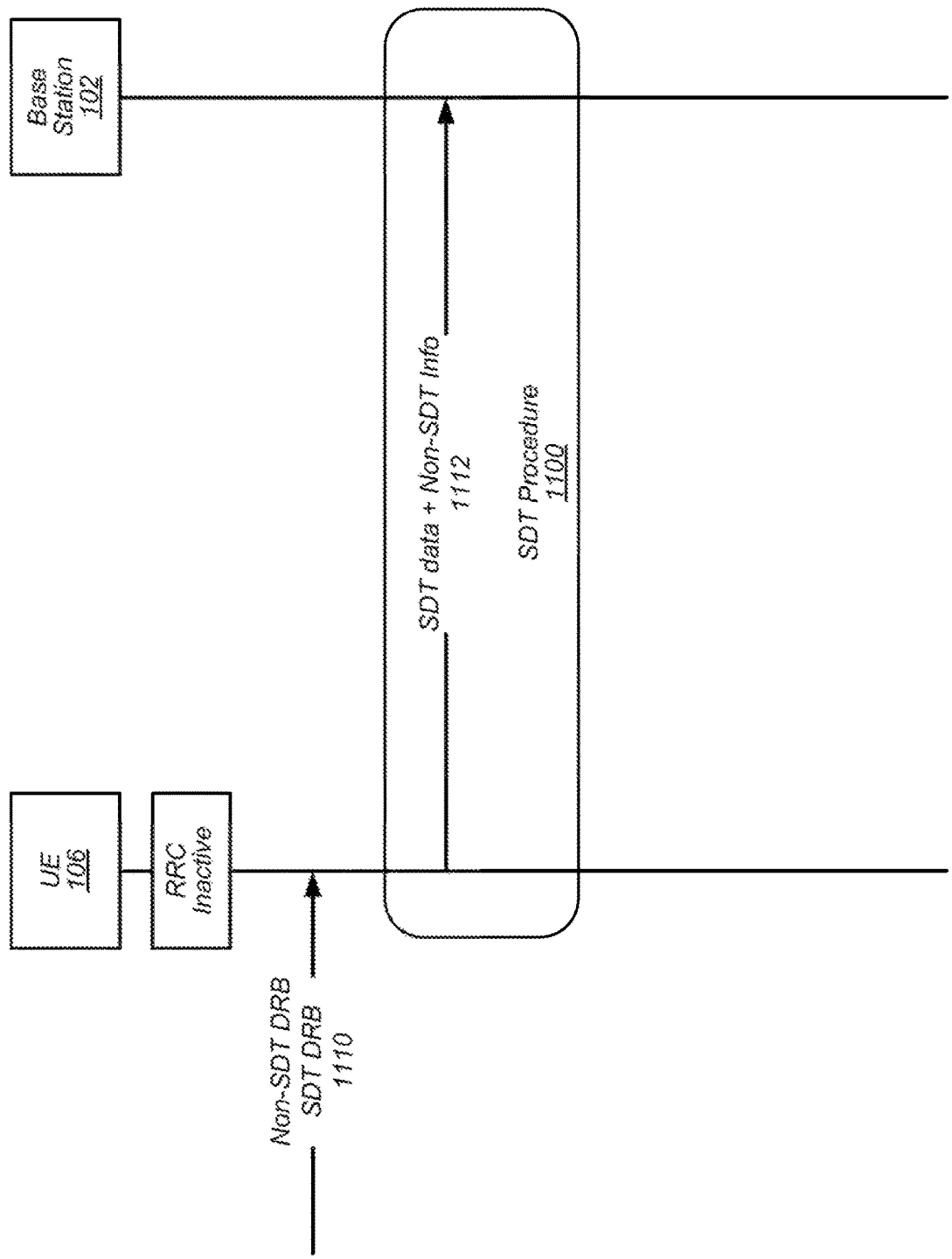
FIGS. 11A-11E illustrate examples of UE behavior upon arrival of non-SDT data before initiation of an SDT procedure, according to some aspects.

FIGS. 11A-11E illustrate examples of UE behavior upon arrival of non-SDT data before initiation of an SDT procedure, according to some aspects. For example, FIG. 11A illustrates an example of UE behavior upon simultaneous (and/or substantially simultaneous) arrival of SDT and non-SDT data at the UE. In some aspects, if both the SDT and non-SDT data arrive at the same time, the UE may trigger an SDT procedure and indicate non-SDT data arrival information to a base station during the SDT procedure. As shown, a UE, such as UE 106, may be in an RRC inactive state upon arrival of non-SDT DRB and SDT DRB 1110. Thus, the UE may initiate an SDT procedure 1100 with a base station, such as base station 102, and transmit non-SDT arrival information along with SDT data at 1112.

Figure 11B:
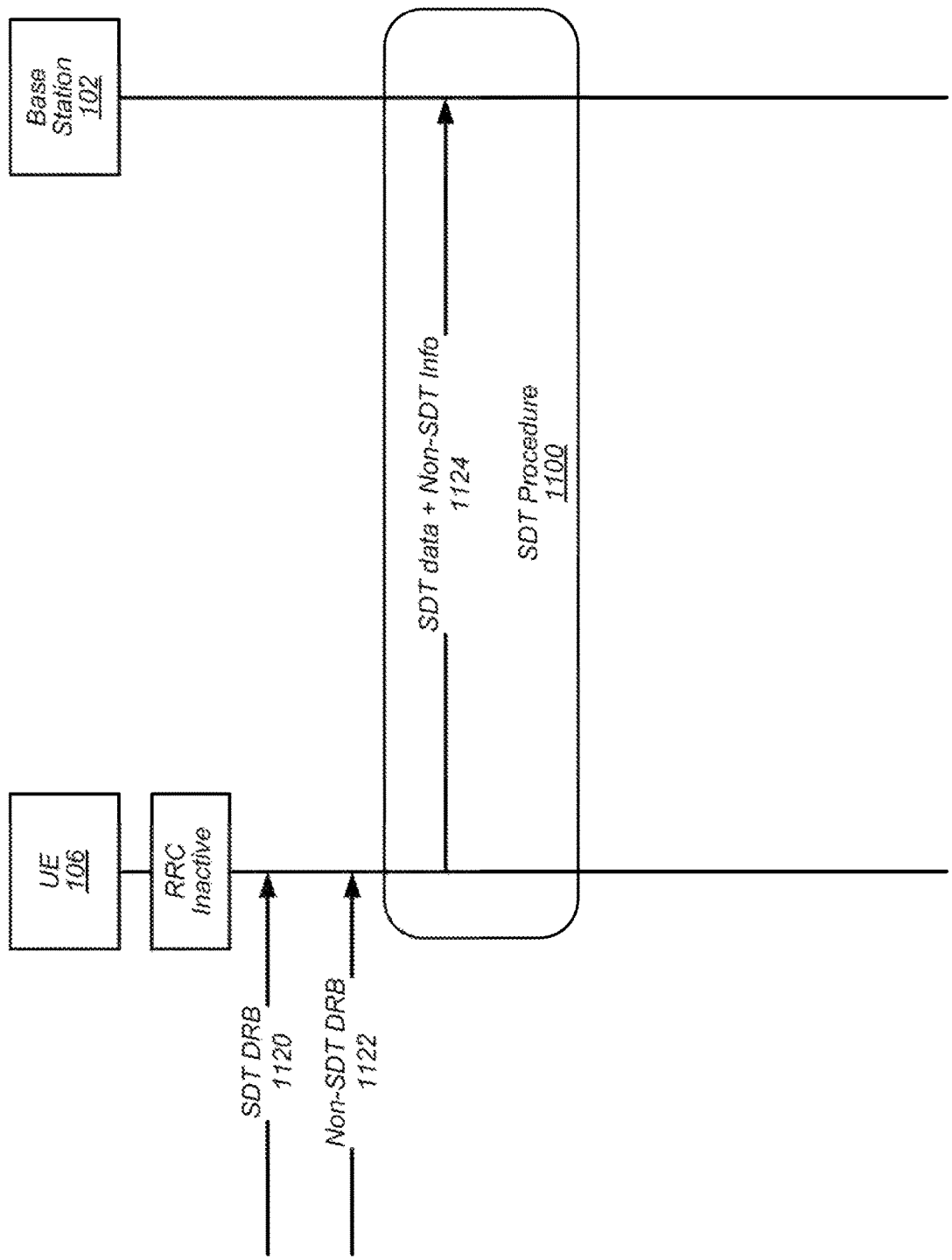

As another example, FIG. 11B illustrates an example of UE behavior when non-SDT data arrives after SDT data but prior to initiation of an SDT procedure, in some aspects, before the LTE assembles the MAC PDU for the first SDT transmission, if non-SDT data has arrived, the LTE may carry the non-SDT data arrival information in the MAC PDU of the first SDT transmission. As shown, a UE, such as UE 106, may be in an RRC inactive state upon arrival of non-SDT DRB 1122 and SDT DRB 1120. Thus, the UE may initiate an SDT procedure 1100 with a base station, such as base station 102, and transmit non-SDT arrival information along with SDT data at 1124, e.g., based, at least in part, on the non-SDT DRB 1122 arriving prior to initiation of the SDT procedure 1100.

Figure 11C:
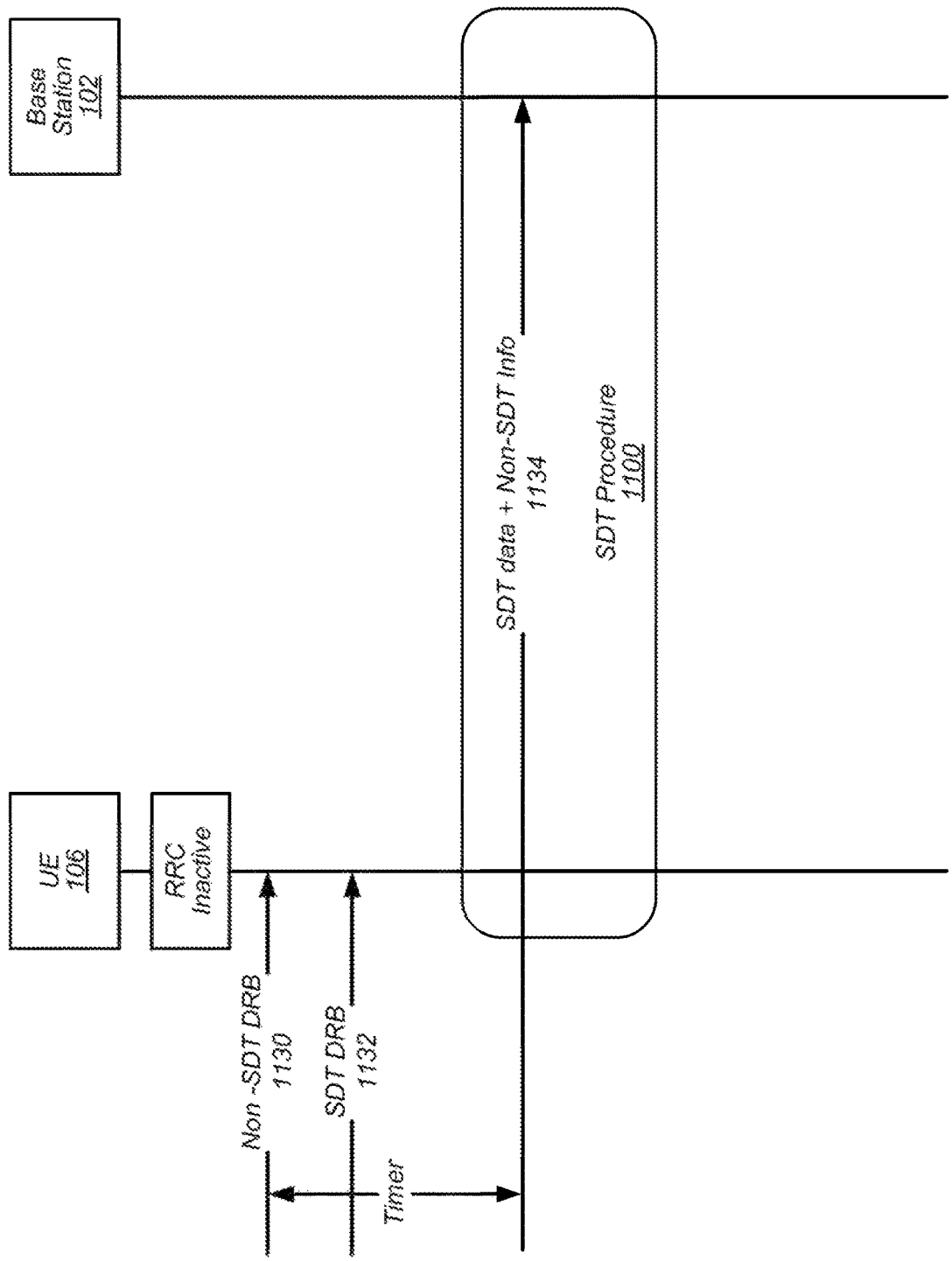
Figure 11D:
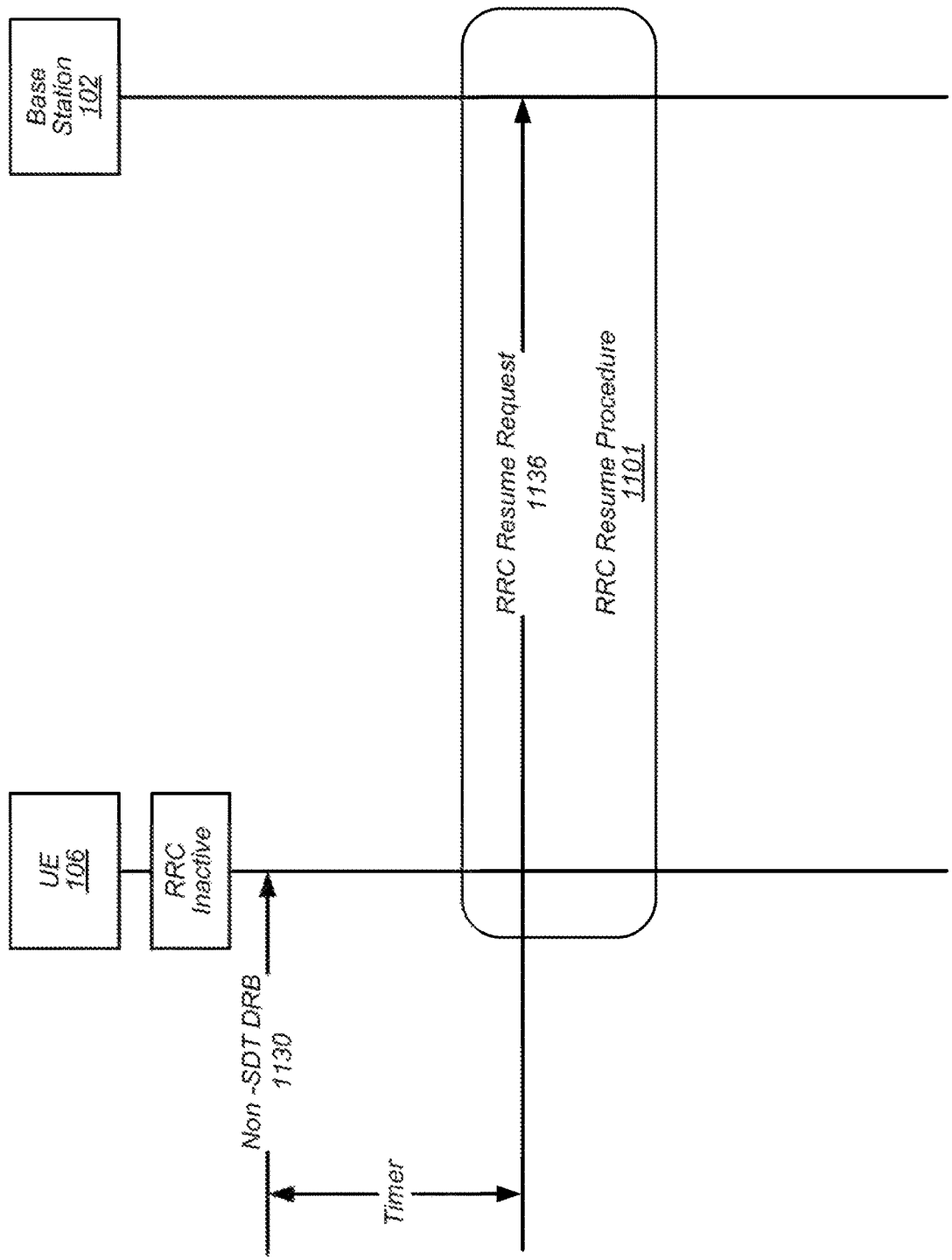

As further examples, FIGS. 11C and 11D illustrate examples of UE behavior when non-SDT data arrives prior to SDT data. In some aspects, the UE may initiate a timer, e.g., to delay an RRC resume procedure, upon arrival on the non-SDT data while the UE is an RRC inactive state. Then, if the SDT data arrives before timer expiry, the UE may trigger the SDT procedure, stop the timer, and report the non-SDT data arrival information during the SDT procedure. Alternatively, upon timer expiry, the UE may trigger the RRC resume procedure, if SDT data has not arrived prior to timer expiry. Note that the timer may defined via a 3GGP specification) and/or configured by the base station (e.g., by the network). As shown by FIG. 11C, a UE, such as UE 106, may be in an RRC inactive state upon arrival of non-SDT DRB 1130 and initiate a timer. Then, prior to expiration of the timer, the SDT DRB 1132 may arrive. Thus, the LTE may initiate an SDT procedure 1100 with a base station, such as base station 102, and transmit non-SDT arrival information along with SDT data at 1134, e.g., based, at least in part, on the SDT DRB 1132 arriving, prior to expiration of the timer. Alternatively, as shown by FIG. 11D, a UE, such as UE 106, may be in an RRC inactive state upon arrival of non-SDT DRB 1130 and initiate a timer. Then, upon expiration of the timer without arrival of SDT DRBs, the LTE may initiate an RRC resume procedure 1101 with a base station, such as base station 102, and transmit an RRC resume request message 1136. Upon completion of the RRC resume procedure 1101, the UE may then transmit non-SDT DRB 1130.

Figure 11E:
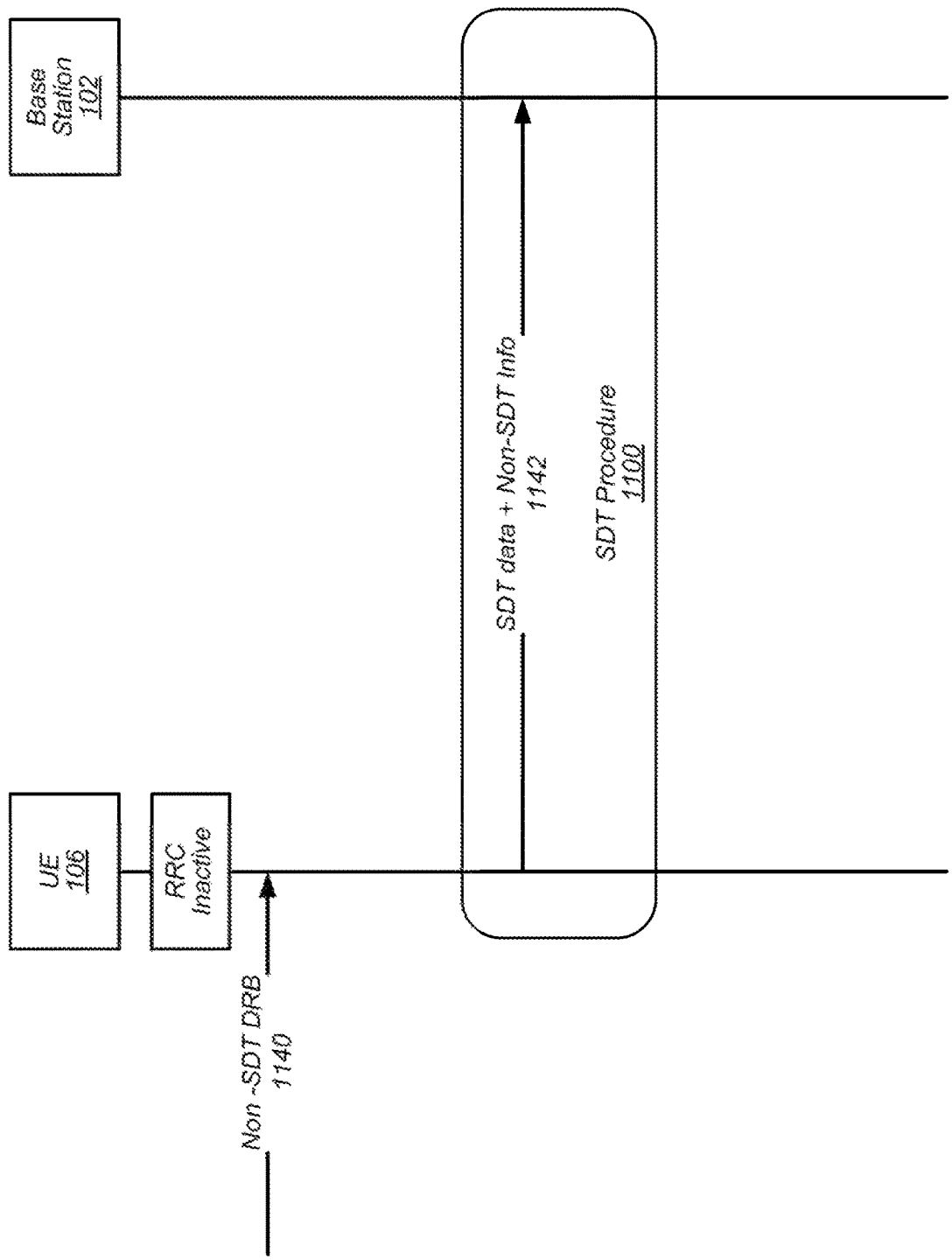

As a further example, FIG. 11E illustrates another example of non-SDT data arriving prior to SDT data. In some aspects, the UE may trigger an SDT procedure and report the non-SDT data arrival information to the network. As shown, a UE, such as UE 106, may be in an RRC inactive state upon arrival of non-SDT DRB 114. Thus, the UE may initiate an SDT procedure 1100 with a base station, such as base station 102, and transmit non-SDT arrival information along with SDT data at 1142.

Figure 12A:
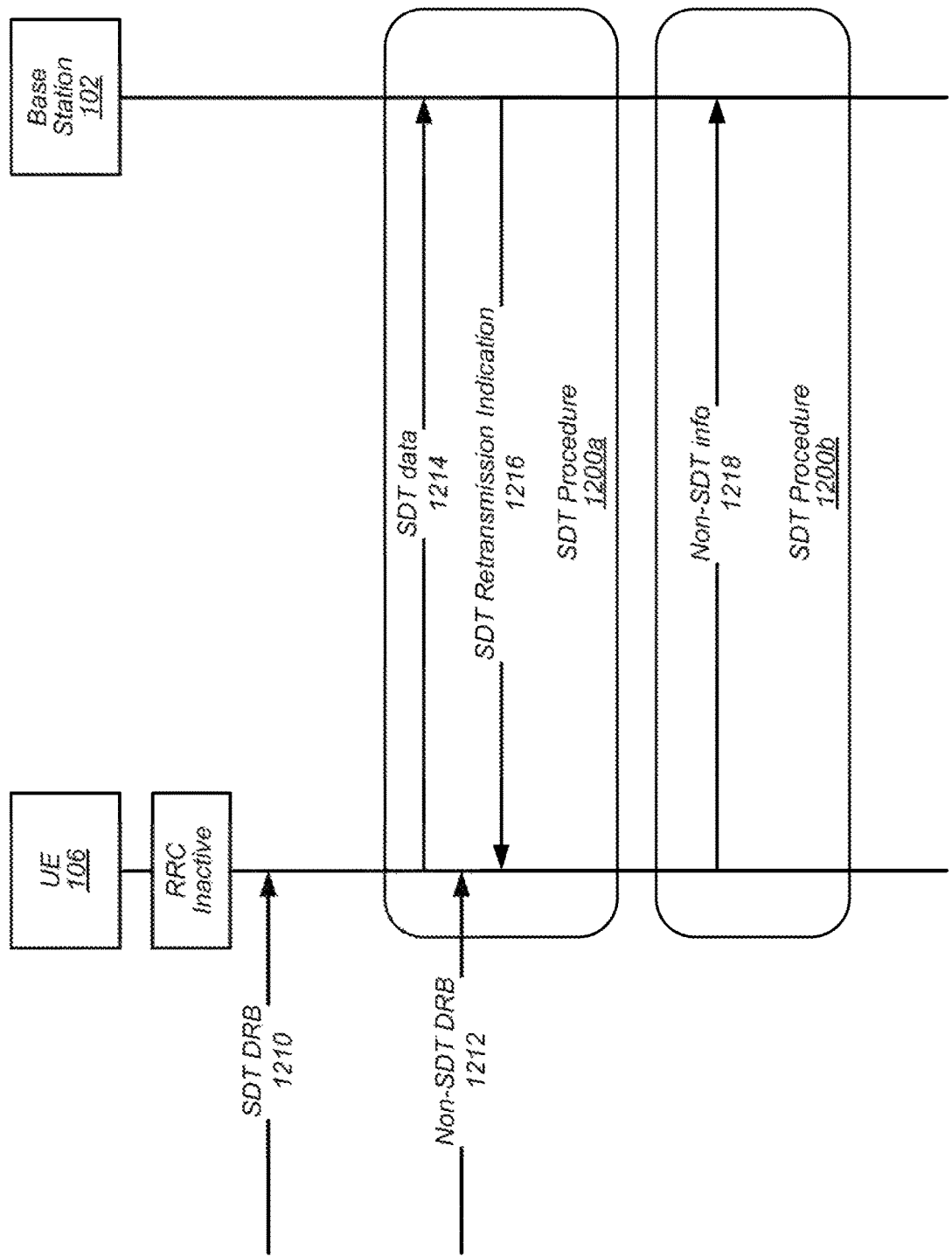
FIGS. 12A-12D illustrate examples of UE behavior upon arrival of non-SDT data after initiation on an SDT procedure, according to some aspects.

FIGS. 12A-12D illustrate examples of UE behavior upon arrival of non-SDT data after initiation on an SDT procedure, according to some aspects. In some aspects, the UE may delay an initial access and wait for a network response. For example, if the network indicates that the UE enters an SDT subsequent transmission period, the UE may deliver the non-SDT data arrival information during that period. As shown in FIG. 12A, a UE, such as UE 106, may be in an RRC inactive state upon arrival of SDT DRB 1210. The UE may initiate an SDT procedure 1200a with a base station, such as base station 102, and transmit SDT data 1214. The UE may also receive an SDT retransmission indication 1216 from the base station during the SDT procedure 1200a. Further, during the procedure, the UE may detect arrival of non-SDT DRB 1212. Then, if the network indicates that the UE enters an SDT subsequent transmission period, such as SDT procedure 1200b, the UE may deliver the non-SDT data arrival information 1218 during the SDT procedure 1200b.

Figure 12B:
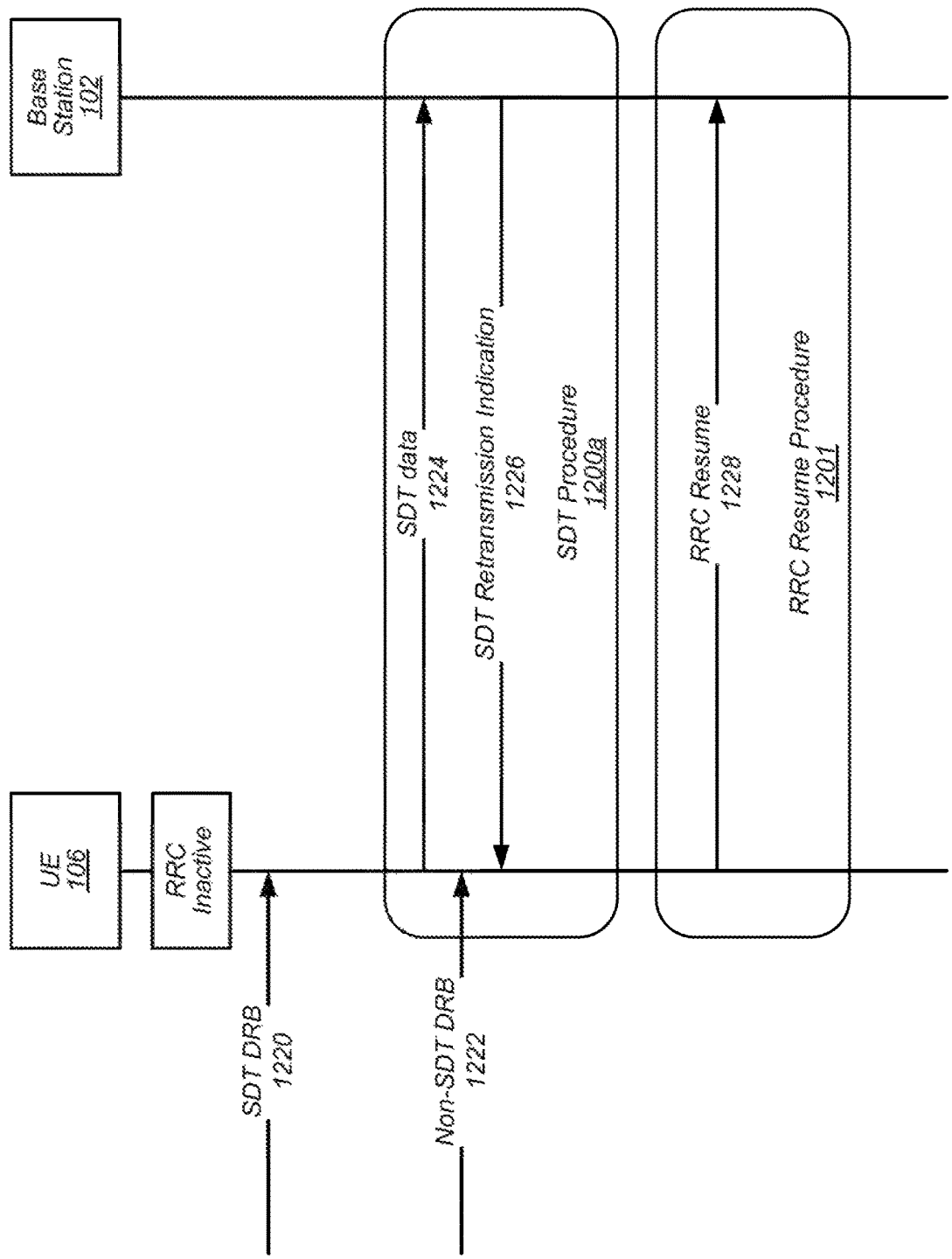

As another example, if the network indicates that the UE transitions to an RRC connected state, the UE may trigger an RRC resume procedure. As shown in FIG. 12B, a UE, such as UE 106, may be in an RRC inactive state upon arrival of SDT DRB 1220. The UE may initiate an SDT procedure 1200a with a base station, such as base station 102, and transmit SDT data 1224. The UE may also receive an SDT retransmission indication 1226 from the base station during the SDT procedure 1200a. Further, during the procedure, the UE may detect arrival of non-SDT DRB 1222. Then, if the network indicates that the UE transitions to an RRC connected state, the UE may trigger an RRC resume procedure 1201 and transmit an RRC resume request 1228. Once the UE has transitioned to the RRC connected state, the UE may transmit the non-SDT DRM 1222.

Figure 12C:
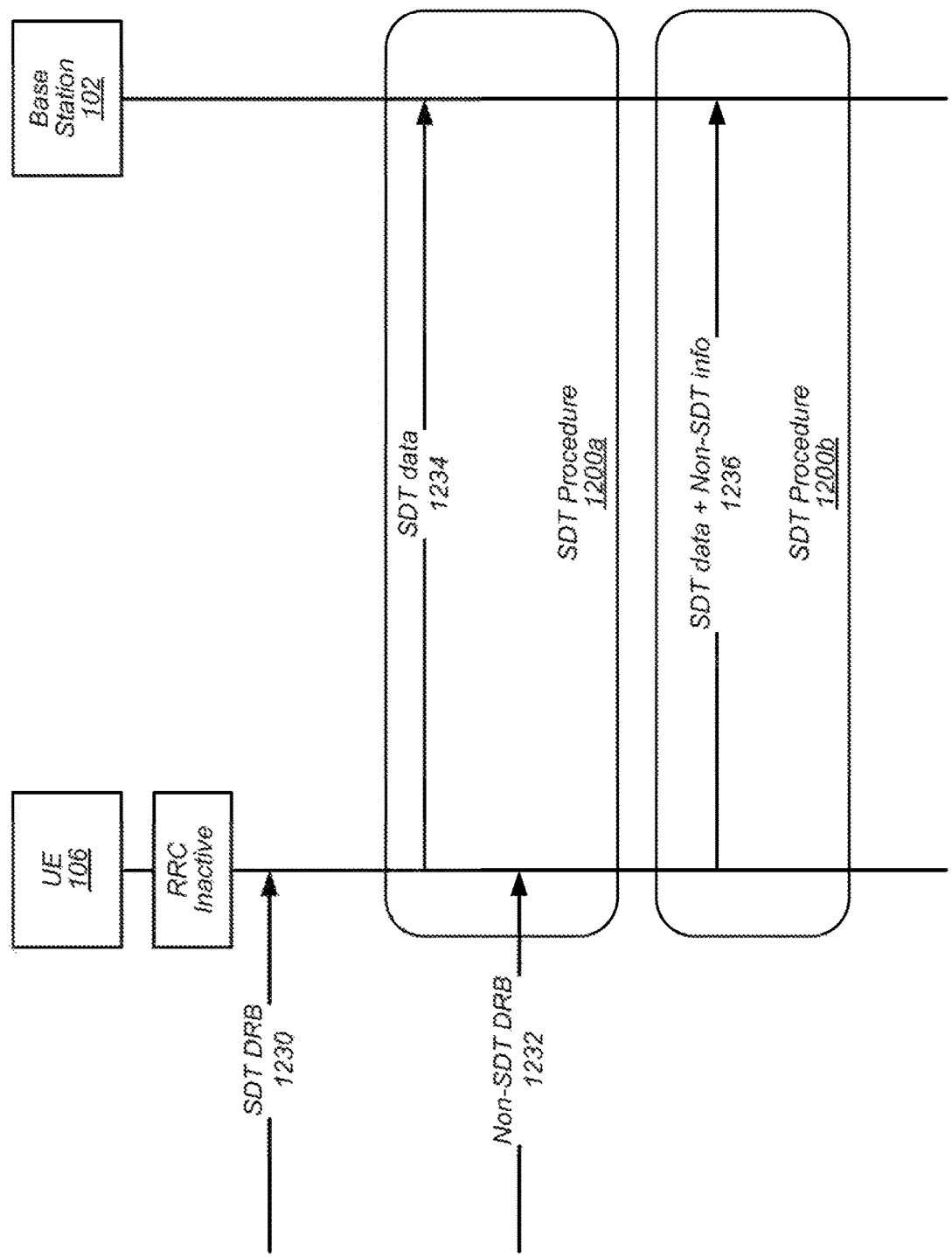

In some aspects, if the RACH procedure (e.g., RRC resume procedure) for SDT access has not been successfully completed, the UE may terminate the previous RACH procedure and trigger a new SDT RACH procedure and carry the non-SDT data arrival information in an SDT transmission. For example, as shown in FIG. 12C, a UE, such as UE 106, may be in an RRC inactive state upon arrival of SDT DRB 1230. The UE may initiate an SDT procedure 1200a with a base station, such as base station 102, and transmit SDT data 1234. Further, during the procedure, the UE may detect arrival of non-SDT DRB 1222. Then, if the RACE procedure (e.g., RRC resume procedure) for SDT access has not been successfully completed, the UE may terminate the previous RACH procedure and trigger a new SDT RACH procedure (e.g., SDT procedure 1200b) and carry the non-SDT data arrival information in an SDT transmission 1236.

Figure 12D:
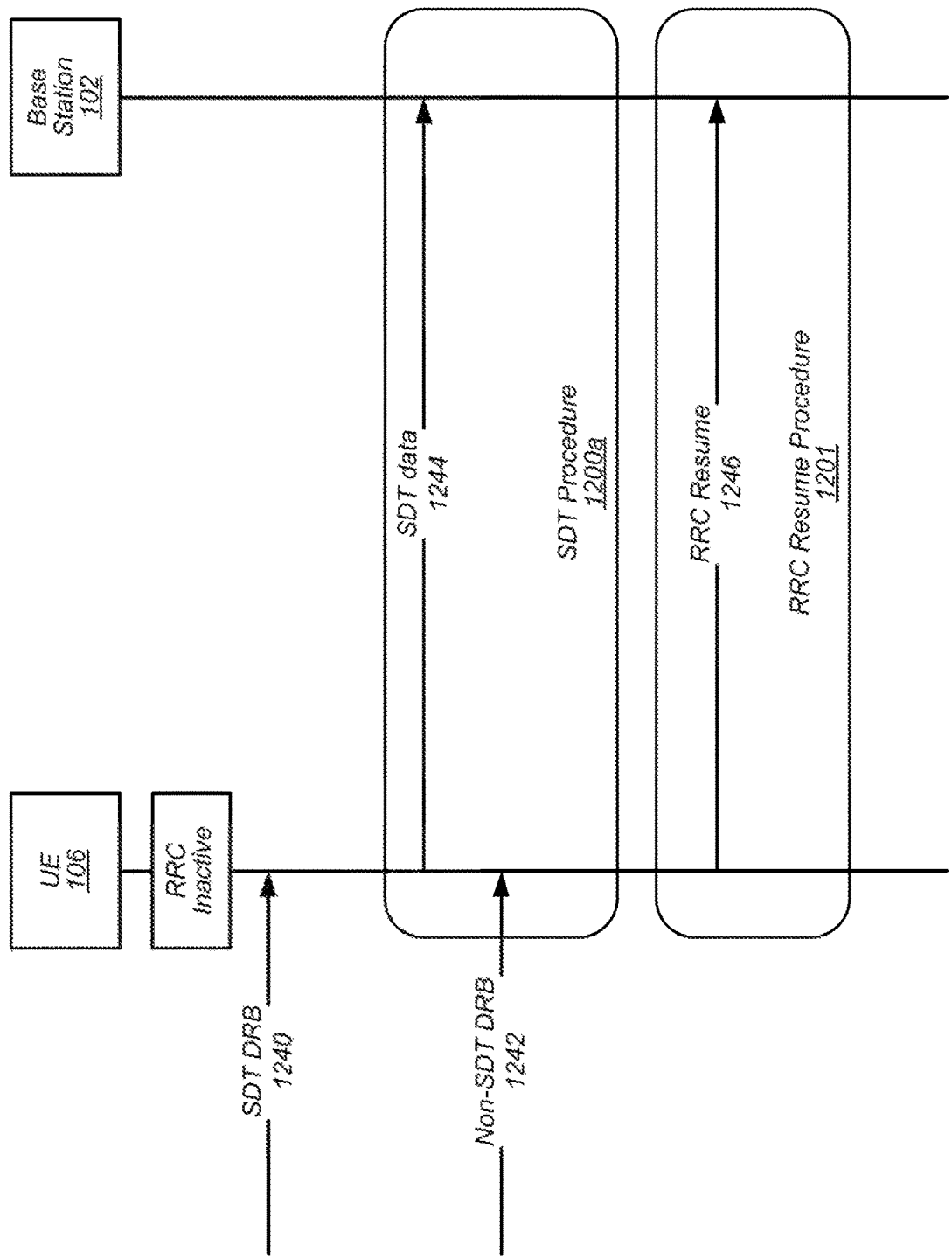

In some aspects, a UE may trigger a legacy resume procedure directly and drop a previous SDT procedure. For example, as shown in FIG. 12D, a UE, such as UE 106, may be in an RRC inactive state upon arrival of SDT DRB 1240. The UE may initiate an SDT procedure 1200*a* with a base station, such as base station 102, and transmit SDT data 1244. Further, during the procedure, the UE may detect arrival of non-SDT DRB 1242. Then, the UE may trigger a legacy resume procedure, such as RRC resume procedure 1201 and drop the SDT procedure 1200*a*. During the RRC resume procedure 1201, the UE may transmit RRC resume request 1246. Once the UE has transitioned to the RRC connected state, the UE may transmit the non-SDT DRM 1242.

Figure 13:
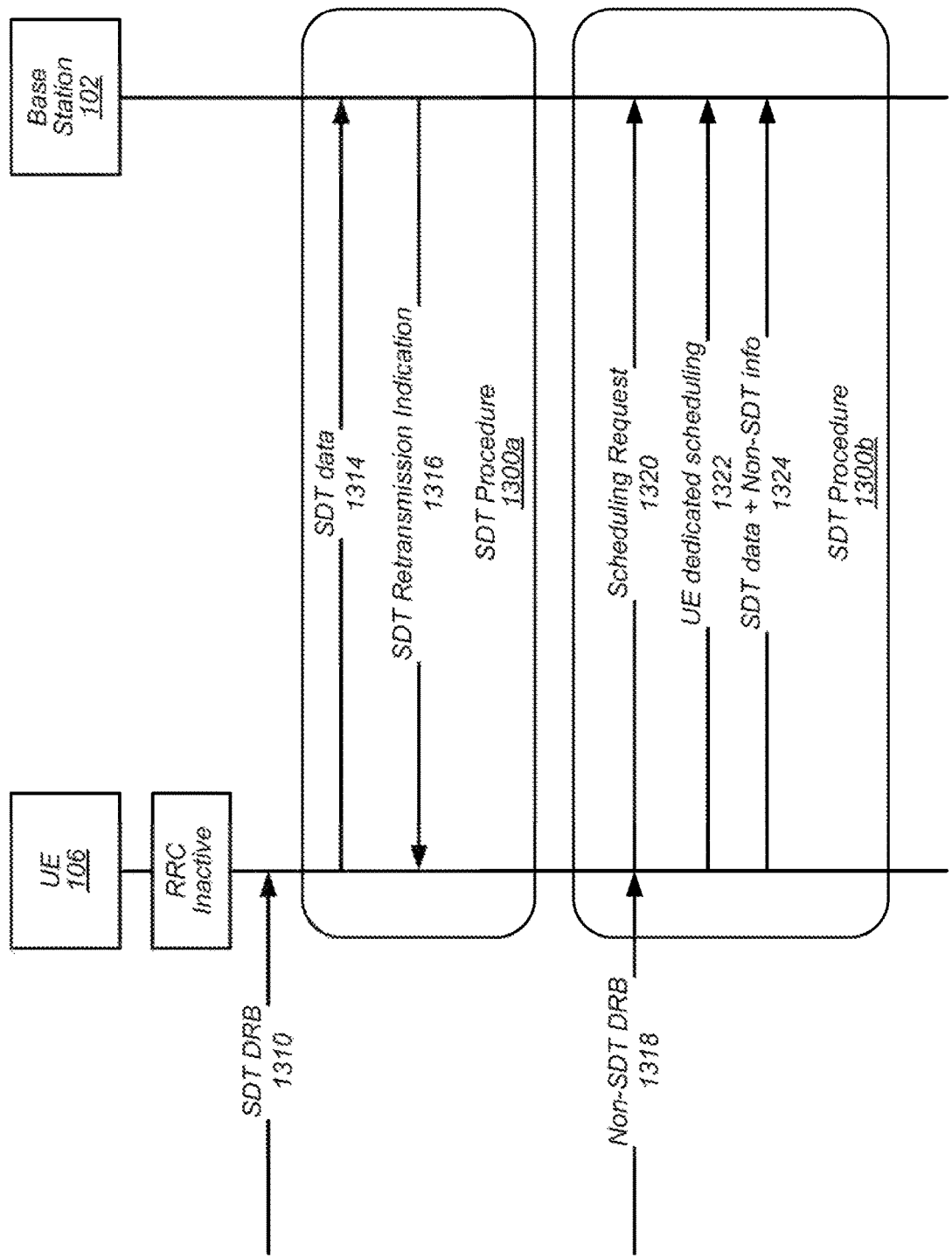
FIG. 13 illustrates an example of UE behavior upon arrival of non-SDT data during a subsequent SDT procedure.

FIG. 13 illustrates an example of UE behavior upon arrival of non-SDT data during a subsequent SDT procedure. In some aspects, the UE may report non-SDT data arrival information to a network via a dedicated scheduling and transmission procedure. Note that if there is no available dedicated UL grant and scheduling request (SR) functionality is supported, the UE may trigger an SR to request the UL grant for the transmission. The UE may transmit a legacy RRCResumeRequest message via the dedicated UL grant and, upon receiving this message, the network may determine that the UE has non-SDT data for transmission. As shown by FIG. 13, a UE, such as UE 106 may be in an RRC inactive state upon arrival of SDT DRB 1310. The UE may initiate an SDT procedure 1300*a* with a base station, such as base station 102, and transmit SDT data 1314. The UE may also receive an SDT retransmission indication 1316 from the base station during the SDT procedure 1200*a*. The UE may then initiate a subsequent SDT procedure 1300*b* and detect arrival of non-SDT DRB 1318 during the subsequent SDT procedure 1300*b*. Then, the UE may transmit a scheduling request 1320 to the base station, followed by a UE dedicated scheduling, message 1322. The UE may then transmit the SDT data with the non-SDT arrival information to the base station 102 during the subsequent SDT procedure 1300*b*.

Figure 14:
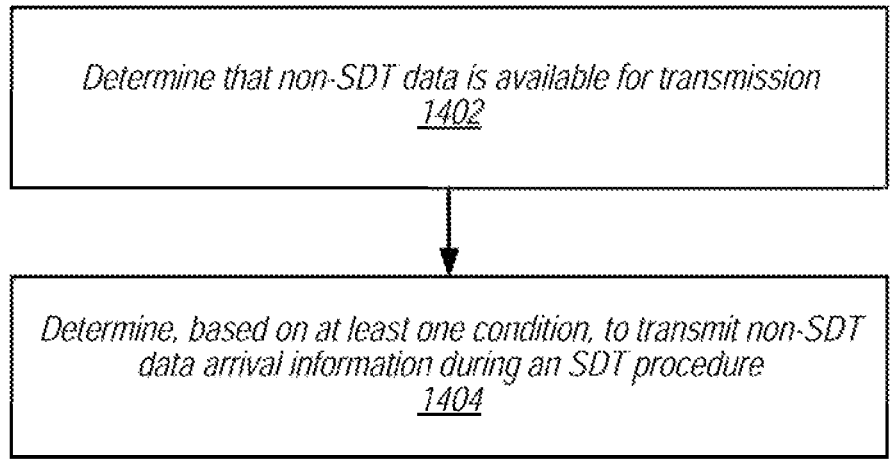
FIG. 14 illustrates a block diagram of an example of a method for non-small data transmission (SDT) dedicated radio bearer (DRB) handling while in a radio resource control (RC) inactive state, according to some aspects.

FIG. 14 illustrates a block diagram of an example of a method for non-small data transmission (SDT) dedicated radio hearer (DRB) handling while in a radio resource control (RRC) inactive state, according to some aspects. The method shown in FIG. 14 may be used in conjunction with any of the systems, methods, or devices shown in the Figures, among other devices. In various aspects, some of the method elements shown may be performed concurrently, in a different order than shown, or may be omitted. Additional method elements may also be performed as desired. As shown, this method may operate as follows.

At 1402, a UE, such as UE 106, may determine, e.g., while operating in an RRC inactive state, that non-SDT data is available for transmission, e.g., on a non-SDT DRB.

At 1404, the UE may determine, based on at least one condition and/or based on one or more conditions, to transmit non-SDT data arrival information during an SDT procedure.

For example, when the non-SDT data arrives prior to initiating an SDT procedure, the at least one condition (and/or the one or more conditions) may include any, any combination of, and/or all of the LTE determining that SDT data is available for transmission on an SDT DRB when the SDT data and the non-SDT data arrive approximately simultaneously (e.g., at the same time and/or within a negligible time period between arrivals), the UE determining that SDT data is available for transmission on an SDT DRB when the SDT data arrives prior to the non-SDT data and when the non-SDT data arrives prior to assembly of an SDT MAC PDU, the UE determining that SDT data is available for transmission on an SDT DRB When the SDT data arrives within a time period after arrival of the non-SDT data (e.g., the UE may monitor the time period via initiation of a timer upon arrival of the non-SDT data), and/or the UE receiving a configuration from the base station to trigger an SDT procedure upon arrival of the non-SDT data. Note that the time period may be defined by a specification (e.g., 3GPP standard), configured by the base station, and/or carrier specific. In some aspects, the UE may initiate an RRC resume procedure based on not determining SDT data arrival during the time period and transmit the non-SDT DRB upon entering RRC connected state.

As another example, when the non-SDT data arrives during an initial transmission period of an SDT procedure, the at least one condition (and/or the one or more conditions) may include any, any combination of, and/or all of the UE receiving, from the base station, instructions to enter a subsequent transmission period of the SDT procedure (e.g., the UE may delay an RRC resume procedure upon arrival of the non-SDT data) or the UE terminating a RACH procedure associated with initiation of the SDT procedure and triggering a new RACH procedure to initiated a new SDT procedure. Note that the non-SDT data arrival information may be transmitted via the new SDT procedure and the UE may determine that the RACH procedure for the SDT procedure was not complete upon arrival of the non-SDT data. In some aspects, the UE may receive, from the base station, instructions to return to an RRC inactive state and not enter a subsequent transmission period of the SDT procedure. In response, the UE may initiate an RRC resume procedure and transmit the non-SDT DRB upon entering an RRC connected state. In some aspects, the UE may terminate the SDT procedure, initiate an RRC resume procedure, and transmit the non-SDT DRB upon entering an RRC connected state.

As a further example, when the non-SDT data arrives during a subsequent transmission period of an SDT procedure, the at least one condition (and/or the one or more conditions) may include any, any combination of, and/or all of the UE reporting, to the base station, the non-SDT data arrival information via dedicated scheduling and transmission during the subsequent transmission period or the UE transmitting an RRC resume request message via a dedicated uplink grant of the SDT procedure. In some aspects, when the dedicated uplink grant is not available, the UE may report the non-SDT data arrival information by triggering a scheduling request (SR) to request an uplink grant for the transmission during the subsequent transmission period.

In some aspects, the non-SDT data arrival information may include one bit indicating that non-SDT data is available and/or one bit indicating a request for the UE to transition to an RRC connected state. In some aspects, the non-SDT data arrival information may include a buffer status of the non-SDT DRB. The buffer status of the non-SDT DRB may be included in a buffer status report (BSR) medium access control (MAC) control element (CE). In some aspects, the non-SDT data arrival information may be signaled via at least one of L1 signaling, L2 signaling, and/or L3 signaling. For example, for L1 signaling, the non-SDT data arrival information may be carried in uplink control information (UCI) on a physical uplink control channel (PUCCH). As another example, for L2 signaling, the non-SDT data arrival information may be carried in a dedicated medium access control (MAC) control element (CE) or in a buffer status report (BSR) MAC CE. As a further example, for L3 signaling, the non-SDT data arrival information may be carried in a first RRC resume request message of an SDT procedure when arrival of the non-SDT data occurs before initiation of an SDT procedure or one of an RRC resume request message or a unified air interface (UAI) message to report UE information when arrival of the non-SDT data occurs during a SDT subsequent transmission period.

In some aspects, the non-SDT data arrival information may indicate an amount on non-SDT data to be transmitted. In such aspects, whether the UE initiates an RRC resume procedure may be dependent on the amount of non-SDT data to be transmitted. For example, the UE may receive, from the base station, an RRC message indicating a transition to an RRC connected state. The indication may be based, at least in part, on the amount of non-SDT data indicated by the non-SDT data arrival information exceeding a threshold value. The UE may then initiate an RRC resume procedure and transmit, after completion of the RRC resume procedure, the non-SDT DRB. As another example, the UE may receive, from the base station, a network command to transmit the non-SDT data via the SDT procedure. The command may be based, at least in part, on the amount of non-SDT data indicated by the non-SDT data arrival information not exceeding the threshold value. The UE may then resume the non-SDT DRB and transmit, after resuming the non-SDT DRB, the non-SDT DRB while remaining in an RRC inactive state. In some aspects, the command may be received via a MAC CE. Note that the threshold value may be predefined (e.g., via a 3GPP standard), configured by the base station (e.g., by the network), and/or carrier specific.

Figure 15:
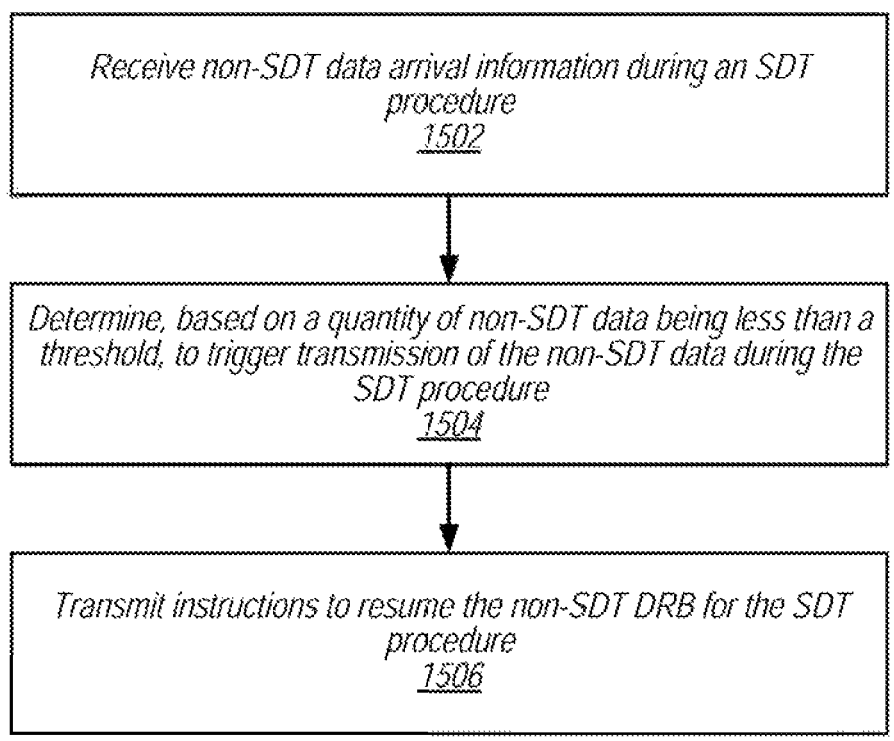
FIG. 15 illustrates a block diagram of an example of a method for non-small data transmission (SDT) dedicated radio bearer (DRB) handling, according to some aspects.

FIG. 15 illustrates a block diagram of an example of a method for non-small data transmission (SDT) dedicated radio bearer (DRB) handling, according to some aspects. The method shown in FIG. 15 may be used in conjunction with any of the systems, methods, or devices shown in the Figures, among other devices. In various aspects, some of the method elements shown may be performed concurrently, in a different order than shown, or may be omitted. Additional method elements may also be performed as desired. As shown, this method may operate as follows.

At 1502, a base station, such as base station 102, may receive, from a UE, such as UE 106, non-SDT data arrival information during an SDT procedure. Note that the UE may be operating in an RRC inactive state. In some aspects, the non-SDT data arrival information may include one bit indicating that non-SDT data is available and/or one bit indicating a request for the UE to transition to an RRC connected state. In some aspects, the non-SDT data arrival information may include a buffer status of the non-SDT DRB. The buffer status of the non-SDT DRB may be included in a buffer status report (BSR) medium access control (MAC) control element (CE). In some aspects, the non-SDT data arrival information may be received via at least one of L1 signaling, L2 signaling, and/or L3 signaling. For example, for L1 signaling, the non-SDT data arrival information may be carried in uplink control information (UCI) on a physical uplink control channel (PUCCH). As another example, for L2 signaling, the non-SDT data arrival information may be carried in a dedicated medium access control (MAC) control element (CE) or in a buffer status report (BSR) MAC CE. As a further example, for L3 signaling, the non-SDT data arrival information may be carried in a first RRC resume request message of an SDT procedure when arrival of the non-SDT data occurs before initiation of an SDT procedure or one of an RRC resume request message or a unified air interface (UAI) message to report UE information when arrival of the non-SDT data occurs during a SDT subsequent transmission period.

At 1504, the base station may determine, based at least in part, on a quantity of non-SDT data being less than a threshold, to trigger the UE to transmit the non-SDT data via the SDT procedure, e.g., while the UE remains in an RRC inactive state. In other words, the non-SDT data arrival information may indicate an amount on non-SDT data to be transmitted. Thus, whether the UE initiates an RRC resume procedure may be dependent on the amount of non-SDT data to be transmitted. For example, the base station may send, to the UE, an RRC message indicating a transition to an RRC connected state. The indication may be based, at least in part, on the amount (and/or quantity) of non-SDT data indicated by the non-SDT data arrival information exceeding a threshold and/or threshold value. The UE may then initiate an RRC resume procedure and transmit, after completion of the RRC resume procedure, the non-SDT DRB. Note that the threshold (and/or threshold value) may be predefined (e.g., via a 3GPP standard), configured by the base station (e.g., by the network), and/or carrier specific.

At 1506, the base station may transmit, to the UE, instructions to resume the non-SDT DRB for the SDT procedure. In some aspects, the instructions (and/or command) may be transmitted via a MAC CE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of the method aspects described herein, or, any combination of the method aspects described herein, or, any subset of any of the method aspects described herein, or, any combination of such subsets.

In some aspects, a device (e.g., a UE 106) may be configured to include a processor (or a set of processors) and a memory medium, where the memory medium stores program instructions, where the processor is configured to read and execute the program instructions from the memory medium where the program instructions are executable to implement any of the various method aspects described herein (or, any combination of the method aspects described herein, or, any subset of any of the method aspects described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for non-small data transmission (SDT) dedicated radio bearer (DRB) handling for a user equipment device (UE), comprising:
   determining, while the UE is operating in a radio resource control (RRC) inactive state and during an initial transmission period of an SDT procedure, that non-SDT data is available for transmission on a non-SDT DRB;
   refraining from sending an initial access message based, at least in part, on the determining that the non-SDT data is available;
   receiving an indication to enter a subsequent transmission period of the SDT procedure; and
   transmitting, to a base station and based on the indication, non-SDT data arrival information during the subsequent transmission period of the SDT procedure.

2. The method of claim 1,
   wherein the non-SDT data arrival information includes one bit indicating that non-SDT data is available.

3. The method of claim 1,
   wherein the non-SDT data arrival information is signaled via at least one of layer 1 (L1) signaling, layer 2 (L2) signaling, or layer 3 (L3) signaling;
   wherein for L1 signaling, the non-SDT data arrival information is carried in uplink control information (UCI) on a physical uplink control channel (PUCCH);
   wherein, for L2 signaling, the non-SDT data arrival information is carried in a dedicated medium access control (MAC) control element (CE) or in a buffer status report (BSR) MAC CE; and
   wherein, for L3 signaling, the non-SDT data arrival information is carried in a first RRC resume request message of an SDT procedure when arrival of the non-SDT data occurs before initiation of an SDT procedure or one of an RRC resume request message or a unified air interface (UAI) message to report UE information when arrival of the non-SDT data occurs during a SDT subsequent transmission period.

4. The method of claim 1,
   wherein the non-SDT data arrival information indicates an amount of non-SDT data to be transmitted;
   wherein, when the amount of non-SDT data indicated by the non-SDT data arrival information exceeds a threshold value, the method further comprises:
      receiving, from the base station, an RRC message indicating a transition to an RRC connected state, wherein the indication is based, at least in part, on the amount of non-SDT data indicated by the non-SDT data arrival information exceeding the threshold value;
      initiating an RRC resume procedure; and
      transmitting, after completion of the RRC resume procedure and entering an RRC connected state, the non-SDT DRB; and
   wherein, when the amount of non-SDT data indicated by the non-SDT data arrival information does not exceed the threshold value, the method further comprises:
      receiving, from the base station, a network command to transmit the non-SDT data via the SDT procedure, wherein the command is based, at least in part, on the amount of non-SDT data indicated by the non-SDT data arrival information not exceeding the threshold value;
      resuming the non-SDT DRB; and
      transmitting, after resuming the non-SDT DRB, the non-SDT DRB while remaining in an RRC inactive state.

5. The method of claim 1,
   wherein the non-SDT data arrival information includes one bit indicating a request for the UE to transition to an RRC connected state.

6. The method of claim 1,
   wherein the non-SDT data arrival information includes a buffer status of the non-SDT DRB, and wherein the buffer status of the non-SDT DRB is included in a buffer status report (BSR) medium access control (MAC) control element (CE).

7. A user equipment device (UE), comprising:
   at least one antenna;
   at least one radio, wherein the at least one radio is configured to perform cellular communication using at least one radio access technology (RAT); and
   one or more processors coupled to the at least one radio, wherein the one or more processors and the at least one radio are configured to communications;
   wherein the one or more processors are configured to cause the UE to:
      determine, while operating in a radio resource control (RRC) inactive state and during an initial transmission period of an SDT procedure, that non-small data transmission (non-SDT) data is available for transmission on a non-SDT dedicated radio bearer (DRB);
      refrain from sending an initial access message based, at least in part, on the determining that the non-SDT data is available;
      receive an indication to enter a subsequent transmission period of the SDT procedure; and
      transmit, to a base station, non-SDT data arrival information during the subsequent transmission period of the SDT procedure.

8. The UE of claim 7,
   wherein the non-SDT data arrival information includes: one bit indicating that non-SDT data is available.

9. The UE of claim 7,
   wherein the non-SDT data arrival information is signaled via at least one of layer 1 (L1) signaling, layer 2 (L2) signaling, or layer 3 (L3) signaling;
   wherein for L1 signaling, the non-SDT data arrival information is carried in uplink control information (UCI) on a physical uplink control channel (PUCCH);
   wherein, for L2 signaling, the non-SDT data arrival information is carried in a dedicated medium access control (MAC) control element (CE) or in a buffer status report (BSR) MAC CE; and
   wherein, for L3 signaling, the non-SDT data arrival information is carried in a first RRC resume request message of an SDT procedure when arrival of the non-SDT data occurs before initiation of an SDT procedure or one of an RRC resume request message or a unified air interface (UAI) message to report UE information when arrival of the non-SDT data occurs during a SDT subsequent transmission period.

10. The UE of claim 7,
    wherein the non-SDT data arrival information indicates an amount of non-SDT data to be transmitted;

wherein, when the amount of non-SDT data indicated by the non-SDT data arrival information exceeds a threshold value, the one or more processors are further configured to cause the UE to:
- receive, from the base station, an RRC message indicating a transition to an RRC connected state, wherein the indication is based, at least in part, on the amount of non-SDT data indicated by the non-SDT data arrival information exceeding the threshold value;
- initiate an RRC resume procedure; and
- transmit, after completion of the RRC resume procedure and entering an RRC connected state, the non-SDT DRB; and wherein, when the amount of non-SDT data indicated by the non-SDT data arrival information does not exceed the threshold value, the one or more processors are further configured to cause the UE to:
- receive, from the base station, a network command to transmit the non-SDT data via the SDT procedure, wherein the command is based, at least in part, on the amount of non-SDT data indicated by the non-SDT data arrival information not exceeding the threshold value;
- resume the non-SDT DRB; and
- transmit, after resuming the non-SDT DRB, the non-SDT DRB while remaining in an RRC inactive state.

11. The UE of claim 7,
wherein the non-SDT data arrival information includes one bit indicating a request for the UE to transition to an RRC connected state.

12. The UE of claim 7,
wherein the non-SDT data arrival information includes a buffer status of the non-SDT DRB, and wherein the buffer status of the non-SDT DRB is included in a buffer status report (BSR) medium access control (MAC) control element (CE).

13. A method for non-small data transmission (SDT) dedicated radio bearer (DRB) handling, comprising:
- receiving, from a user equipment device (UE) operating in a radio resource control (RRC) inactive state, non-SDT data arrival information during an SDT procedure;
- determining, based at least in part, on a quantity of non-SDT data being less than a threshold, to trigger the UE to transmit the non-SDT data via the SDT procedure; and
- transmitting, to the UE, instructions to resume the non-SDT DRB for the SDT procedure.

14. The method of claim 13,
wherein the non-SDT data arrival information includes one or more of:
- one bit indicating that non-SDT data is available;
- one bit indicating a request for the UE to transition to an RRC connected state; or
- a buffer status of the non-SDT DRB.

15. The method of claim 14,
wherein the buffer status of the non-SDT DRB is included in a buffer status report (BSR) medium access control (MAC) control element (CE).

16. The method of claim 13,
wherein the non-SDT data arrival information is received via at least one of layer 1 (L1) signaling, layer 2 (L2) signaling, or layer 3 (L3) signaling.

17. The method of claim 16,
wherein for L1 signaling, the non-SDT data arrival information is carried in uplink control information (UCI) on a physical uplink control channel (PUCCH);
wherein, for L2 signaling, the non-SDT data arrival information is carried in a dedicated medium access control (MAC) control element (CE) or in a buffer status report (BSR) MAC CE; and/or
wherein, for L3 signaling, the non-SDT data arrival information is carried in a first RRC resume request message of an SDT procedure when arrival of the non-SDT data occurs before initiation of an SDT procedure or one of an RRC resume request message or a unified air interface (UAI) message to report UE information when arrival of the non-SDT data occurs during a SDT subsequent transmission period.

18. The method of claim 13, further comprising:
- determining, based at least in part, on a quantity of non-SDT data being greater than the threshold, to trigger the UE to transition to an RRC connected state; and
- transmitting, to the UE, an RRC resume message indicated the transition to the RRC connected state.

19. The method of claim 18, further comprising:
- receiving, from the UE, an RRC resume complete message; and
- receiving, from the UE, the non-SDT DRB.

20. The method of claim 13,
wherein the instructions are transmitted via a medium access control (MAC) control element (CE).

* * * * *